(12) United States Patent
Sugimoto et al.

(10) Patent No.: US 9,701,833 B2
(45) Date of Patent: Jul. 11, 2017

(54) TONER BINDER AND TONER

(71) Applicant: SANYO CHEMICAL INDUSTRIES, LTD., Kyoto-shi, Kyoto (JP)

(72) Inventors: Yuko Sugimoto, Kyoto (JP); Keisuke Miyamoto, Kyoto (JP); Masaru Honda, Kyoto (JP)

(73) Assignee: SANYO CHEMICAL INDUSTRIES, LTD., Kyoto-shi (JP)

( * ) Notice: Subject to any disclaimer, the term of this patent is extended or adjusted under 35 U.S.C. 154(b) by 0 days.

(21) Appl. No.: 14/852,034

(22) Filed: Sep. 11, 2015

(65) Prior Publication Data

US 2015/0376401 A1    Dec. 31, 2015

Related U.S. Application Data

(62) Division of application No. 14/379,333, filed as application No. PCT/JP2013/001056 on Feb. 25, 2013, now abandoned.

(30) Foreign Application Priority Data

Feb. 29, 2012    (JP) ................................. 2012-044166

(51) Int. Cl.
| | |
|---|---|
| C08L 67/03 | (2006.01) |
| C08G 63/672 | (2006.01) |
| C08L 67/02 | (2006.01) |
| G03G 9/087 | (2006.01) |
| C08L 67/00 | (2006.01) |

(52) U.S. Cl.
CPC ............ *C08L 67/03* (2013.01); *C08G 63/672* (2013.01); *C08L 67/00* (2013.01); *C08L 67/02* (2013.01); *C08L 67/025* (2013.01); *G03G 9/08755* (2013.01); *G03G 9/08791* (2013.01); *G03G 9/08797* (2013.01); *C08L 2205/02* (2013.01)

(58) Field of Classification Search
None
See application file for complete search history.

(56) References Cited

U.S. PATENT DOCUMENTS

| | | |
|---|---|---|
| 2007/0281235 A1 | 12/2007 | Ono et al. |
| 2009/0269691 A1 | 10/2009 | Yamato et al. |
| 2011/0065034 A1 | 3/2011 | Arima et al. |
| 2013/0202997 A1 | 8/2013 | Iwagoe et al. |
| 2013/0273469 A1 | 10/2013 | Akutagawa et al. |

FOREIGN PATENT DOCUMENTS

| | | | |
|---|---|---|---|
| JP | 8-328303 A | | 12/1996 |
| JP | 9-179343 A | | 7/1997 |
| JP | 2004-285131 A | | 10/2004 |
| JP | 2006-154686 A | | 6/2006 |
| JP | 2006-243715 A | | 9/2006 |
| JP | 2007-11307 A | | 1/2007 |
| JP | 2007-238954 A | | 9/2007 |
| JP | 2007-264623 A | * | 10/2007 |
| JP | 2009-157308 A | * | 7/2009 |
| JP | 2011-81355 A | | 1/2010 |
| JP | 2011-81355 A | * | 4/2011 |
| WO | 2012/046445 A1 | | 4/2012 |
| WO | 2012/046811 A1 | | 4/2012 |

OTHER PUBLICATIONS

International Search Report dated Apr. 2, 2013, issued in corresponding application No. PCT/JP2013/001056.

* cited by examiner

*Primary Examiner* — Ana Woodward
(74) *Attorney, Agent, or Firm* — Westerman, Hattori, Daniels & Adrian, LLP

(57) ABSTRACT

There is provided a toner binder containing a polyester resin (P) composed of two or more polyester resins that are each obtained by polycondensation of a carboxylic acid component (x) and an alcohol component (y). The alcohol component (y) of at least one polyester resin (P1) constituting the polyester resin (P) comprises 30 to 100 molar % of an adduct (y1) of bisphenol A with 2 to 4 ethylene oxide molecules. The alcohol component (y) of at least one other polyester resin (P2) constituting the polyester resin (P) comprises 50 to 95 molar % of an aliphatic diol (y2) having 2 to 4 carbon atoms. The (P2) is other than the (P1), and the polyester resin (P) satisfies relationships as follows. $11.5 \leq SP$ value $[(cal/cm^3)^{1/2}]$ of $(P) \leq 13.0$; and $5.2 \leq HLB$ value (according to the Oda method) of $(P) \leq 7.1$.

10 Claims, No Drawings

TONER BINDER AND TONER

CROSS-REFERENCE TO RELATED APPLICATION

This application is a divisional of U.S. application Ser. No. 14/379,333, filed on Aug. 18, 2014, which is a 371 of International Application No. PCT/JP2013/001056, filed on Feb. 25, 2013, which claims the benefit of priority from the prior Japanese Patent Application No. 2012-044166, filed on Feb. 29, 2012, the entire contents of which are incorporated herein by reference.

TECHNICAL FIELD

The present invention relates to a toner binder and a toner to be used for electrophotography, electrostatic recording, electrostatic printing, and so on.

BACKGROUND ART

A toner binder for electrophotography for a heat fixing system, which is a fixing system of images commonly applied in copiers, printers and the like, is required to allow a toner not to fuse to a hot roller even at a high fixing temperature (hot offset resistance), to be capable of fixing a toner even at a low fixing temperature (low-temperature fixing property), to have storage stability as microparticles (blocking resistance), and the like.

In order to improve such fixing performances of a toner, it is conventionally known to use incompatible resins specialized in a low temperature range and a high temperature range as a matrix phase and a domain phase, respectively. In addition, there is proposed a method in which a compatibilizing agent for compatibilizing the incompatible resins is contained in a vinyl resin such as a styrene type polymer (Patent Document 1 and the like).

In order to improve blocking resistance, especially blocking resistance in relation to storage stability under a high-temperature and -humidity environment, there is proposed a toner binder composed of a polyester resin obtained by using a specific polyol component such as 1,2-propylene glycol and neopentyl glycol, without consideration for the SP value range and the HLB value range (Patent Document 2 and the like).

PRIOR ART DOCUMENTS

Patent Documents

Patent Document 1: JP-A-8-328303
Patent Document 2: JP-A-2006-154686

SUMMARY OF THE INVENTION

Problems to be Solved by the Invention

Recently, however, copiers and printers have been increasingly demanded to have color capability, high speed, high reliability, compaction, low cost, and energy conservation. Especially, due to a demand for reduction in environmental load (energy conservation), there are requests for reconciling of further low-temperature fixing property and blocking resistance of a toner and for a resin further improved in electrification characteristics, and therefore immediate actions are required.

Conventional toners composed of a matrix phase and a domain phase do not sufficiently satisfy all of fixing properties (balance between low-temperature fixing property and hot offset resistance) and storage stability, and they are requested to have a particularly wide fixing temperature range when recent high-speed machines or small electronic copiers are used.

An object of the present invention is to provide a toner binder and a toner, wherein the toner binder, when used in a toner, can ensure a widened fixing temperature range, excellent blocking resistance under high-temperature and -humidity conditions, and excellent electrification characteristics.

Solutions to the Problems

In order to solve these problems, the present inventors have studied intensively, and thus have achieved the present invention.

That is, the present invention includes the following two inventions.

[I] A toner binder which contains a polyester resin (P) composed of two or more polyester resins that are each obtained by polycondensation of a carboxylic acid component (x) and an alcohol component (y), wherein the alcohol component (y) of at least one (P1) constituting the (P) contains 30 to 100 molar % of an adduct (y1) of bisphenol A with 2 to 4 ethylene oxide molecules, the alcohol component (y) of at least one (P2) constituting the (P) contains 50 to 95 molar % of an aliphatic diol (y2) having 2 to 4 carbon atoms, the (P2) is other than the (P1), and the (P) satisfies relationships (1) and (2), $$11.5 \leq SP \text{ value } [(cal/cm^3)^{1/2}] \text{ of } (P) \leq 13.0 \tag{1}$$

$$5.2 \leq HLB \text{ value [according to the Oda method] of } (P) \leq 7.1 \tag{2}.$$

[II] A toner which contains the above-mentioned toner binder, a colorant and, as necessary, one or more additives selected from a release agent, a charge controlling agent and a fluidizer.

Effects of the Invention

Use of the toner binder of the present invention has made it possible to provide a toner which can ensure a widened fixing temperature range, excellent blocking resistance under high-temperature and -humidity conditions, and excellent electrification characteristics (saturated electrification amount, rise of electrification, electrification stability).

MODE FOR CARRYING OUT THE INVENTION

The present invention is described in detail below.

The toner binder of the present invention contains a polyester resin (P) composed of two or more polyester resins that are each obtained by polycondensation of a carboxylic acid component (x) and an alcohol component (y).

In terms of fixing property and blocking resistance under high-temperature and -humidity conditions, the polyester resin (P) is required to satisfy the following: the alcohol component (y) of at least one (P1) constituting the (P) contains 30 to 100 molar % of an adduct (y1) of bisphenol A with 2 to 4 ethylene oxide (hereinafter abbreviated as EO) molecules, the alcohol component (y) of at least one (P2) constituting the (P) contains 50 to 95 molar % of an aliphatic diol (y2) having 2 to 4 carbon atoms, and the (P2) is one other than the (P1) [namely, one not containing 30 to 100 molar % of the (y1) in the (y)]. The (P1) and the (P2) each may be used in a combination of two or more thereof.

In terms of fixing temperature range when used as a toner, the polyester resin (P) is preferably composed of a linear polyester resin (A) and a nonlinear polyester resin (B). The (A) and the (B) each may be used in a combination of two or more thereof.

When the polyester resin (P) is composed of the linear polyester resin (A) and the nonlinear polyester resin (B), the (A) and/or the (B) is required to contain the (P1) and the (A) and/or the (B) is required to contain the (P2). In terms of fixing property, it is preferable that the (A) be the (P1) and it is more preferable that the (B) be the (P2).

In the following description, a linear polyester resin (A) that corresponds to the (P1) containing 30 to 100 molar % of the adduct (y1) of bisphenol A with 2 to 4 EO molecules in the alcohol component (y) may be denoted by a linear polyester resin [P1(A)], a nonlinear polyester resin (B) that corresponds to the (P1) may be denoted by a nonlinear polyester resin [P1(B)], a linear polyester resin (A) that corresponds to the (P2) containing 50 to 95 molar % of the aliphatic diol (y2) having 2 to 4 carbon atoms in the alcohol component (y) may be denoted by a linear polyester resin [P2(A)], and a nonlinear polyester resin (B) that corresponds to the (P2) may be denoted by a nonlinear polyester resin [P2(B)].

Examples of the alcohol component (y) that constitutes the linear polyester resin (A) include diols, tri- to octa- or higher hydric polyols, and monools.

Examples of the diols include aliphatic diols (y2) having 2 to 4 carbon atoms (ethylene glycol, 1,2-propylene glycol, 1,3-propylene glycol, 1,4-butanediol, diethylene glycol, and the like), aliphatic diols having 5 to 36 carbon atoms (neopentyl glycol, 2,3-dimethylbutane-1,4-diol, 1,6-hexanediol, 1,8-octanediol, and the like); alkylene ether glycols having 5 to 36 carbon atoms (triethylene glycol, dipropylene glycol, tripropylene glycol, polyethylene glycol, polypropylene glycol, polytetramethylene ether glycol, and the like); alicyclic diols having 6 to 36 carbon atoms (1,4-cyclohexanedimethanol, hydrogenated bisphenol A, and the like); (poly)oxyalkylene [the number of carbon atoms of the alkylene group is 2 to 4 (oxyethylene, oxypropylene, and the like), the same applies also to the following polyoxyalkylene groups] ethers of the above-mentioned alicyclic diols [the number of oxyalkylene unit(s) (hereinafter abbreviated as AO unit(s)) is 1 to 30]; and polyoxyalkylene ethers (the number of AO units is 2 to 30) of dihydric phenols [monocyclic dihydric phenols (e.g., hydroquinone) and bisphenols (bisphenol A, bisphenol F, bisphenol S, and the like)], and two or more thereof may be used in combination.

Preferred among these are polyoxyalkylene ethers (the number of AO units is 2 to 30) of bisphenols (bisphenol A, bisphenol F, bisphenol S, and the like), more preferred is the adduct (y1) of bisphenol A with 2 to 4 EO molecules, and particularly preferred is an 85% or more adduct (y11) of bisphenol A with 2 EO molecules.

Examples of the tri- to octa- or higher hydric polyols include aliphatic tri- to octa- or higher polyhydric alcohols having 3 to 36 carbon atoms (alkane polyols and their intramolecular or intermolecular dehydration products, e.g., glycerol, trimethylolethane, trimethylolpropane, pentaerythritol, sorbitol, sorbitan, polyglycerol, and dipentaerythritol; saccharides and derivatives thereof, e.g., sucrose and methyl glucoside); (poly)oxyalkylene ethers (the number of AO unit(s) is 1 to 30) of the above-mentioned aliphatic polyhydric alcohols; polyoxyalkylene ethers (the number of AO units is 2 to 30) of trisphenols (trisphenol PA and the like); and polyoxyalkylene ethers (the number of AO units is 2 to 30) of novolac resins (phenol novolac, cresol novolac, and the like; average degree of polymerization: 3 to 60), and two or more thereof may be used in combination.

Preferred among such tri- to octa- or higher hydric polyols are polyoxyalkylene ethers (the number of AO units is 2 to 30) of novolac resins.

Examples of the monools include alkanols having 1 to 30 carbon atoms (methanol, ethanol, isopropanol, dodecyl alcohol, myristyl alcohol, cetyl alcohol, stearyl alcohol, and the like).

Preferred among such monools are alkanols having 8 to 24 carbon atoms, and dodecyl alcohol, myristyl alcohol, stearyl alcohol, and combinations thereof are more preferred.

When the linear polyester resin (A) is a linear polyester resin [P1(A)], examples of the alcohol component (y) that constitutes the [P1(A)] include, in addition to the essential adduct (y1) of bisphenol A with 2 to 4 EO molecules, diols other than the (y1), tri- to octa- or higher hydric polyols, and monools.

Usually, a commercially available adduct of bisphenol A with 2 to 4 EO molecules contains unreacted bisphenol A, an adduct with one EO molecule and an adduct with 5 or more EO molecules in a small amount as impurities in addition to an adduct with 2 to 4 EO molecules.

In the present invention, the adduct (y1) of bisphenol A with 2 to 4 EO molecules is defined as one that contains an adduct with 2 to 4 EO molecules in 80% or more relative to the whole of the adducts with EO (including unreacted bisphenol A, an adduct with one EO molecule, adducts with 2 to 4 EO molecules and adducts with 5 or more EO molecules) as measured by the method described below.

For example, an adduct of bisphenol A with 2 EO molecules is defined as one that contains an adduct with 2 EO molecules in 60% or more relative to the whole of the adducts with EO (including unreacted bisphenol A, an adduct with one EO molecule, an adduct with 2 EO molecules, and adducts with 3 or more EO molecules) as measured by the method described below, and an adduct of bisphenol A with 3 EO molecules is defined as one that contains an adduct with 3 EO molecules in 60% or more relative to the whole of the adducts with EO (including unreacted bisphenol A, adducts with 1 to 2 EO molecules, an adduct with 3 EO molecules, and adducts with 4 or more EO molecules) as measured by the method described below. The same applies also to an adduct of bisphenol A with 4 EO molecules.

Since the adduct of bisphenol A with 2 EO molecules, the adduct with 3 EO molecules, and the adduct with 4 EO molecules usually satisfy also the definition of the above-mentioned adduct (y1) of bisphenol A with 2 to 4 EO molecules, they correspond to the (y1).

In the present invention, when an adduct of bisphenol A with 2 EO molecules is used as the adduct (y1) of bisphenol A with 2 to 4 EO molecules to be used for the polyester resin (P1), the purity thereof (the content of the 2 molar adduct) is preferably 85% or more, more preferably 90% or more in terms of storage stability. In terms of storage stability, the content of the adduct of bisphenol A with one EO molecule in the adduct (y1) of bisphenol A with 2 to 4 EO molecules is preferably 1.5% or less, more preferably 1.2% or less.

When an 85% or more pure adduct (y11) of bisphenol A with 2 EO molecules is used, storage stability is particularly good.

The content of the adduct of bisphenol A with 2 to 4 EO molecules in the adducts of bisphenol A with EO in the present invention, the purity of the adduct (y11) of bisphenol A with 2 EO molecules, and the content of the adduct of bisphenol A with one EO molecule in the adduct (y1) of bisphenol A with 2 to 4 EO molecules are values determined by the methods described below.

One milliliter of a silylation agent [TMSI-H, produced by GL Sciences, Inc.] is added to 30 to 50 mg of a sample (an adduct of bisphenol A with EO), which is dissolved in a hot water bath (50 to 70° C.), followed by vibration for 2 minutes to perform silylation. The mixture is left at rest for separation, followed by gas chromatography analysis of the supernatant liquid to measure the peak areas of unreacted bisphenol A, an adduct with one EO molecule, an adduct with 2 EO molecules, an adduct with 3 EO molecules, an adduct with 4 EO molecules, and an adduct with 5 EO molecules.

The area of the adduct with 2 EO molecules, the adduct with 3 EO molecules and the adduct with 4 EO molecules in the total peak area, expressed in percentage, is taken as the content of the adduct of bisphenol A with 2 to 4 EO molecules.

The area of the adduct with 2 EO molecules in the total peak area, expressed in percentage, is taken as the purity of the adduct of bisphenol A with 2 EO molecules.

The area of the adduct with one EO molecule in the total peak area, expressed in percentage, is taken as the content of the adduct of bisphenol A with one EO molecule in the adduct (y1) of bisphenol A with 2 to 4 EO molecules. No unreacted bisphenol A or no adduct with 6 or more EO molecules existed in the adducts of bisphenol A with 2 to 4 EO molecules used in Example and Comparative Examples of the present invention.

[Conditions for Gas Chromatography Measurement]

Gas chromatograph: GC-14B [manufactured by Shimadzu Corporation]
Carrier gas: helium
Flow rate: 5 mL/min
Detector: hydrogen flame ionization detector
Hydrogen pressure: 0.6 kg/cm$^2$
Air pressure: 0.5 kg/cm$^2$
Column temperature: 200 to 300° C. (temperature elevation rate: 15° C./min)

The content of the adduct (y1) of bisphenol A with 2 to 4 EO molecules in the alcohol component (y) of the linear polyester resin [P1(A)] [in this context, this means an alcohol component that serves as a constitutional unit of the linear polyester resin [P1(A)] except alcohol components to be removed from the system during a polycondensation reaction] is usually 30 to 100 molar %, preferably 50 to 100 molar % in terms of fixing property.

The preferred content of the above-mentioned (y1) applies also to the case of the nonlinear polyester resin [P1(B)].

When the linear polyester resin (A) is a linear polyester resin [P2(A)], examples of the alcohol component (y) that constitutes the [P2(A)] include, in addition to the essential aliphatic diol (y2) having 2 to 4 carbon atoms, diols other than the (y2), tri- to octa- or higher hydric polyols, and monools.

Examples of the aliphatic diol (y2) having 2 to 4 carbon atoms include those mentioned above, and two or more thereof may be used in combination.

Preferred among these (y2) are ethylene glycol and 1,2-propylene glycol, and ethylene glycol is more preferred.

In terms of storage stability and production efficiency, the linear polyester resin (A) [hereinafter means both [P1(A)] and [P2(A)]] preferably contains at least one of a monool and the monocarboxylic acid (x1) mentioned below in the carboxylic acid component (x) and/or the alcohol component (y), and more preferably contains the monocarboxylic acid (x1) in the carboxylic acid component (x).

When a monool is contained, it is preferably used in such an amount (calculated value) that 5 molar % or more, more preferably 6 to 85 molar %, particularly preferably 8 to 80 molar %, most preferably 10 to 76 molar %, of the terminal carboxyl groups of the (A) are esterified with the monool in terms of storage stability and production efficiency.

The carboxylic acid component (x) that constitutes the linear polyester resin (A) is preferably composed of a polycarboxylic acid (x2) and, as necessary, a monocarboxylic acid (x1), and is more preferably composed of a monocarboxylic acid (x1) and a polycarboxylic acid (x2).

Of the monocarboxylic acid (x1), examples of the aliphatic (including alicyclic) monocarboxylic acid include alkane monocarboxylic acids having 1 to 30 carbon atoms (formic acid, acetic acid, propionic acid, butanoic acid, isobutanoic acid, caprylic acid, capric acid, lauric acid, myristic acid, palmitic acid, stearic acid, behenic acid, cerotic acid, montanic acid, melissic acid, and the like), and alkene monocarboxylic acids having 3 to 24 carbon atoms (acrylic acid, methacrylic acid, oleic acid, linoleic acid, and the like). Of the (x1), examples of the aromatic monocarboxylic acid include aromatic monocarboxylic acids having 7 to 36 carbon atoms (benzoic acid, methylbenzoic acid, p-t-butylbenzoic acid, phenylpropionic acid, naphthoic acid, and the like).

Preferred among such (x1) are aromatic monocarboxylic acids having 7 to 36 carbon atoms; benzoic acid, methylbenzoic acid, and p-t-butylbenzoic acid are more preferred, and benzoic acid is particularly preferred.

When the monocarboxylic acid (x1) is used in the linear polyester resin (A), it is preferably used in such an amount (calculated value) that 5 molar % or more, more preferably 6 to 85 molar %, particularly preferably 8 to 80 molar %, most preferably 10 to 76 molar %, of the terminal hydroxyl groups of the (A) are esterified with the (x1) in terms of storage stability and production efficiency.

In terms of storage stability, the amount of the monocarboxylic acid (x1) in the constitutional units of the linear polyester resin (A) is preferably 30 molar % or less, more preferably 1 to 25 molar %, and particularly preferably 2 to 21 molar % relative to the whole carboxylic acid component (x).

Examples of the polycarboxylic acid (x2) include a dicarboxylic acid (x21) and/or a tri- to hexa- or higher valent polycarboxylic acid (x22).

Examples of the dicarboxylic acid (x21) include alkane dicarboxylic acids having 4 to 36 carbon atoms (e.g., succinic acid, adipic acid, and sebacic acid); alicyclic dicarboxylic acids having 6 to 40 carbon atoms [e.g., dimer acid (dimerized linoleic acid)]; alkene dicarboxylic acids having 4 to 36 carbon atoms (e.g., alkenylsuccinic acids such as dodecenylsuccinic acid, maleic acid, fumaric acid, citraconic acid, and mesaconic acid); aromatic dicarboxylic acids having 8 to 36 carbon atoms (phthalic acid, isophthalic acid, terephthalic acid, naphthalene dicarboxylic acid, and the like); and ester-forming derivatives thereof [lower alkyl (the number of carbon atoms of alkyl: 1 to 4; methyl, ethyl, n-propyl, and the like) esters and acid anhydrides; the same applies also to the following ester-forming derivatives]; and two or more thereof may be used in combination. Preferred among these are alkene dicarboxylic acids having 4 to 20 carbon atoms, aromatic dicarboxylic acids having 8 to 20 carbon atoms, and ester-forming derivatives thereof, and terephthalic acid, isophthalic acid, and/or lower alkyl (the number of carbon atoms of alkyl: 1 to 4) esters thereof (x211) are more preferred.

Examples of the tri- to hexa- or higher valent polycarboxylic acid (x22) include aromatic polycarboxylic acids having 9 to 20 carbon atoms (trimellitic acid, pyromellitic acid, and the like), aliphatic polycarboxylic acids having 6 to 36 carbon atoms (hexanetricarboxylic acid and the like), and ester-forming derivatives thereof, and two or more thereof may be used in combination.

Preferred among these are trimellitic acid, pyromellitic acid, and ester-forming derivatives thereof.

The content of terephthalic acid, isophthalic acid, and/or lower alkyl (the number of carbon atoms of alkyl: 1 to 4) esters thereof (x211) in the polycarboxylic acid (x2) is preferably 85 to 100 molar %, and more preferably 90 to 100 molar % in terms of storage stability.

The molar ratio of the terephthalic acid and/or the lower alkyl ester thereof to the isophthalic acid and/or the lower alkyl ester thereof in the (x211) is preferably from 20:80 to 100:0, and more preferably from 30:70 to 100:0 in terms of the mechanical strength of resin.

The content of the aromatic carboxylic acid in the carboxylic acid component (x) of the linear polyester resin (A) is preferably 80 to 100 molar %, and more preferably 85 to 100 molar % in terms of storage stability and fixing property.

The percentage of the total of the tri- to octa- or higher hydric polyols and the tri- to hexa- or higher valent polycarboxylic acids (x22) in the total of the carboxylic acid component (x) and the alcohol component (y) is preferably 0.1 to 15 molar %, and more preferably 0.2 to 12 molar %. When the percentage is 0.1 molar % or more, the storage stability of a toner is good, whereas when it is 15 molar % or less, the electrification characteristics of a toner are good.

Although the method for producing a linear polyester resin (A) by polycondensation of a carboxylic acid component (x) composed of a polycarboxylic acid (x2) and, as necessary, a monocarboxylic acid (x1) as well as an alcohol component (y) is not particularly limited and, for example, a mixture of the (x1) and (x2) and the (y) can also be polycondensed at once, at least part of the (x2) and the (y) may be polycondensed beforehand in such an equivalent ratio that the hydroxyl groups of the (y) are excessive, then the hydroxyl groups of the resulting polycondensate (AO) may be reacted with the carboxyl groups of the (x1), and further polycondensed. As necessary, after the polycondensation of the (AO) and the (x1), a tri- to hexa- or higher valent polycarboxylic acid (x22) may be charged and allowed to react substantially as monofunctional or bifunctional one, and then polycondensation may be further performed under such conditions that the remaining functional groups are left unreacted. If conditions such as reaction temperature are varied and the (x22) is allowed to react as trifunctional or higher one for crosslinking, a nonlinear polyester resin (B) is formed.

The reaction ratio between the alcohol component (y) and the carboxylic acid component (x) is preferably set to 2/1 to 1/2, more preferably 1.5/1 to 1/1.3, and particularly preferably 1.3/1 to 1/1.2, expressed by an equivalent ratio [OH]/[COOH] of a hydroxyl group and a carboxylic group.

In the present invention, the polycondensation of a carboxylic acid component (x) and an alcohol component (y) in obtaining a polyester resin (P) may be carried out using a publicly known esterification reaction. As a common method, the polycondensation may be carried out, for example, by allowing the components to react in an inert gas (nitrogen gas or the like) atmosphere in the presence of a polymerization catalyst, preferably at a reaction temperature of 150 to 280° C., more preferably 180 to 270° C., particularly preferably 200 to 260° C. Moreover, from the viewpoint of ensuring the polycondensation reaction, the reaction time is preferably 30 minutes or more, particularly preferably 2 to 40 hours.

It is also effective to reduce pressure in order to increase the rate of reaction in the last stage of the reaction.

Furthermore, the polyester synthesized by the above-described method may be subjected to a dehydration reaction at 160 to 180° C. in the presence of a strong acid such as sulfuric acid to form a terminal vinyl group. Especially, when a terminal vinyl group is formed in the linear polyester resin (A), it is preferable, in terms of storage stability and production efficiency, to form the terminal vinyl group in such an amount that 5 molar % or more, more preferably 6 to 85 molar %, particularly preferably 8 to 80 molar %, most preferably 10 to 76 molar %, of the terminal hydroxyl groups of the (A) are modified to vinyl groups (a value calculated from the rate of change of a hydroxyl value; although an ether bond may be by-produced from two terminal hydroxyl groups, the calculation is based on the assumption that all the terminal hydroxyl groups are converted into vinyl groups).

It is preferred to use a polymerization catalyst containing one or more metals selected from titanium, antimony, zirconium, nickel and aluminum as a polymerization catalyst in terms of reactivity and environmental protection, and it is more preferred to use a titanium-containing catalyst.

Examples of the titanium-containing catalyst include titanium alkoxides, titanium potassium oxalate, titanium terephthalate, the catalysts disclosed in JP-A-2006-243715 [titanium dihydroxybis(triethanolaminate), titanium monohydroxytris(triethanolaminate), titanium diisopropoxybis (triethanolaminate), intramolecular polycondensates thereof, and the like], and the catalysts disclosed in JP-A-2007-11307 (titanium tributoxyterephthalate, titanium triisopropoxyterephthalate, titanium diisopropoxyditerephthalate, and the like).

Examples of the antimony-containing catalyst include antimony trioxide.

Examples of the zirconium-containing catalyst include zirconium acetate.

Examples of the nickel-containing catalyst include nickel acetylacetonate.

Examples of the aluminum-containing catalyst include aluminum hydroxide and aluminum triisopropoxide.

Preferably, the loading amount of the catalyst is determined appropriately so that the rate of reaction is maximum. The loading amount is preferably 10 ppm to 1.9%, more preferably 100 ppm to 1.7% relative to all the raw materials. Setting the loading amount to 10 ppm or more is preferred because it affords a high rate of reaction.

Hereinabove and hereinafter, % means % by weight unless otherwise stated.

The SP value of the linear polyester resin (A) [(cal/cm$^3$)$^{1/2}$; the same shall apply hereinafter] is preferably 11.0 to 12.8, more preferably 11.2 to 12.6.

When the SP value is 11.0 or more, the fixing property (on a higher temperature side) is better, whereas when it is 12.8 or less, the blocking resistance under high-temperature and -humidity conditions is improved.

The SP value can be adjusted by the composition and the used amount of the carboxylic acid component (x) and the alcohol component (y) as raw materials.

The SP value in the present invention is calculated by the method proposed by Fedors et al. and disclosed in the following document.

"POLYMER ENGINEERING AND SCIENCE, FEBRUARY, 1974, Vol. 14, No. 2, ROBERT F. FEDORS. (pages 147-154)"

The acid value (AV) of the linear polyester resin (A) (mgKOH/g; the same shall apply hereinafter) is preferably 0 to 60, more preferably 1 to 55, particularly preferably 2 to 50. If the acid value is 60 or less, the electrification characteristics exhibited in use for a toner do not deteriorate.

The hydroxyl value (OHV) of the linear polyester resin (A) (mgKOH/g; the same shall apply hereinafter) is preferably 0 to 125, more preferably 1 to 100. When the hydroxyl value is 125 or less, the hot offset resistance and the storage stability achieved in use for a toner are better.

The acid value and the hydroxyl value in the present invention are measured by the method provided in JIS K0070.

The peak top molecular weight (hereinafter denoted by Mp) of the linear polyester resin (A) is preferably 2000 to 12000, more preferably 2300 to 11500, particularly preferably 2500 to 11000. When the Mp is 2000 or more, a resin strength required for fixation can be obtained, whereas when it is 12000 or less, the low-temperature fixing property achieved in use for a toner is good.

Hereinbefore and hereinafter, the peak top molecular weight (Mp) and the number average molecular weight (Mn) of a polyester resin are measured using gel permeation chromatography (GPC) under the conditions mentioned below.

Apparatus (example): HLC-8120 manufactured by Tosoh Corporation
Column (example): TSKgel GMHXL (2 columns)
TSKgel Multipore HXL-M (1 column)
Measurement temperature: 40° C.
Sample solution: 0.25% by weight solution in tetrahydrofuran (hereinafter denoted by THF)
Solution injection amount: 100 µl
Detection apparatus: refractive index detector
Reference material: TSK Standard Polystyrenes produced by Tosoh Corporation
Standard polystyrene molecular weight=12 points in total, namely, 4480000, 2890000, 1090000, 355000, 190000, 96400, 37900, 18100, 9100, 2800, 1050, and 500.

The molecular weight at which the maximum peak height is shown on the resulting chromatogram is called a peak top molecular weight (Mp). In measurement of the molecular weight of a polyester resin, a solution prepared by dissolving the polyester resin in a THF solvent and separating an insoluble content by filtration with a glass filter was used as a sample solution.

The softening point [Tm] of the linear polyester resin (A) is preferably 70 to 120° C., more preferably 75 to 115° C., and particularly preferably 80 to 110° C. Within this range, the balance between hot offset resistance and low-temperature fixing property is good.

Tm is a value measured as follows.

Using an elevated flow tester {for example, CFT-500D manufactured by Shimadzu Corporation}, 1 g of a measurement sample is pushed out through a nozzle having a diameter of 1 mm and a length of 1 mm by application of a load of 1.96 MPa by means of a plunger while it is heated at a temperature elevation rate of 6° C./min, and a graph of the "plunger descending amount (flow value)" and the "temperature" is drawn. The temperature corresponding to 1/2 of the maximum value of the descending amount of the plunger is read from the graph, and the value (a temperature at which half of the measurement sample is flowed out) is determined as the softening point [Tm].

In terms of storage stability, the glass transition temperature [Tg] of the linear polyester resin (A) is preferably 45° C. or higher. When it is 75° C. or lower, the low-temperature fixing property achieved in use for a toner is good.

Hereinbefore and hereinafter, Tg is measured by using DSC 20 and SSC/580 manufactured by Seiko Instruments Inc. in accordance with the method (DSC method) provided in ASTM D3418-82.

The THF-insoluble content in the linear polyester resin (A) is preferably 5% or less in terms of the low-temperature fixing property achieved in use for a toner. It is more preferably 4% or less, and particularly preferably 3% or less.

The THF-insoluble content in the present invention is determined by using the following method.

Fifty ml of THF is added to 0.5 g of a sample, and stirred and refluxed for 3 hours. After being cooled, the insoluble content is separated by filtration with a glass filter, and the resin content remaining on the glass filter is dried under reduced pressure at 80° C. for 3 hours. Based on the weight ratio of the weight of the dried resin content remaining on the glass filter to the weight of the sample, the insoluble content is calculated.

It is preferable for the toner binder of the present invention in terms of reconciling low-temperature fixing property and hot offset resistance that the polyester resin (P) contain the nonlinear polyester resin (B) as well as the linear polyester resin (A).

Examples of the alcohol component (y) that constitutes the nonlinear polyester resin (B) include the aforementioned diols, tri- to octa- or higher hydric polyols, and monools.

In terms of fixing property, the nonlinear polyester resin (B) is preferably a nonlinear polyester resin [P2(B)] in which the alcohol component (y) [this means, in the present context, an alcohol component that serves as a constitutional unit of the nonlinear polyester resin (B) except alcohol components to be removed from the system during a polycondensation reaction] contains an aliphatic diol (y2) having 2 to 4 carbon atoms in 50 to 95 molar %.

The content of the (y2) in the [P2(B)] is preferably 60 to 93 molar %.

The preferred content of the above-mentioned (y2) applies also to the case of the linear polyester resin [P2(A)].

Examples of the aliphatic diol (y2) having 2 to 4 carbon atoms include those mentioned above, and two or more thereof may be used in combination.

Preferred among these (y2) are ethylene glycol and 1,2-propylene glycol, and ethylene glycol is more preferred.

The carboxylic acid component (x) of the nonlinear polyester resin (B) [hereinafter means both [P1(B)] and [P2(B)]] is preferably composed of a polycarboxylic acid (x2) and, as necessary, a monocarboxylic acid (x1) in terms of electrification characteristics, and is more preferably composed of a monocarboxylic acid (x1) and a polycarboxylic acid (x2).

Examples of the monocarboxylic acid (x1) include those mentioned above and preferred ones are also the same as those mentioned above.

In terms of storage stability, the amount of the monocarboxylic acid (x1) in the constitutional units of the nonlinear polyester resin (B) is preferably 30 molar % or less, more preferably 1 to 25 molar %, and particularly preferably 2 to 20 molar % relative to the whole carboxylic acid component (x).

Examples of the polycarboxylic acid (x2) include those mentioned above.

Preferred among the dicarboxylic acid (x21) are alkene dicarboxylic acids having 4 to 20 carbon atoms, aromatic dicarboxylic acids having 8 to 20 carbon atoms, and ester-forming derivatives thereof, and terephthalic acid, isophthalic acid, and/or lower alkyl (the number of carbon atoms of alkyl: 1 to 4) esters thereof (x211) are more preferred.

Preferred among the tri- to hexa- or higher valent polycarboxylic acid (x22) are trimellitic acid, pyromellitic acid, and ester-forming derivatives thereof.

The content of terephthalic acid, isophthalic acid, and/or lower alkyl (the number of carbon atoms of alkyl: 1 to 4) esters thereof (x211) in the polycarboxylic acid (x2) is preferably 85 to 100 molar %, and more preferably 90 to 100 molar % in terms of storage stability.

The molar ratio of the terephthalic acid and/or the lower alkyl ester thereof to the isophthalic acid and/or the lower alkyl ester thereof in the (x211) is preferably from 20:80 to 100:0, and more preferably from 25:75 to 80:20 in terms of the mechanical strength of resin.

The content of the aromatic carboxylic acid in the carboxylic acid component (x) of the nonlinear polyester resin (B) is preferably 80 to 100 molar %, and more preferably 85 to 100 molar % in terms of storage stability and fixing property.

Moreover, the content of the aromatic carboxylic acid in the (X) in the whole polyester resin (P) is preferably within the above-mentioned range.

In terms of storage stability and production efficiency, the nonlinear polyester resin (B) preferably contains at least one of a monool and a monocarboxylic acid (x1) in the carboxylic acid component (x) and/or the alcohol component (y) and more preferably contains the monocarboxylic acid (x1) in the carboxylic acid component (x).

When a monool is used, it is preferably used in such an amount (calculated value) that 5 molar % or more, more preferably 6 to 85 molar %, particularly preferably 8 to 80 molar %, most preferably 10 to 76 molar %, of the terminal carboxyl groups of the (B) are esterified with the monool in terms of storage stability and production efficiency.

When the monocarboxylic acid (x1) is used, it is preferably used in such an amount (calculated value) that 5 molar % or more, more preferably 6 to 85 molar %, particularly preferably 8 to 80 molar %, most preferably 10 to 76 molar %, of the terminal hydroxyl groups of the (B) are esterified with the (x1) in terms of storage stability and production efficiency.

The reaction conditions of the polycondensation of the carboxylic acid component (x) and the alcohol component (y) in producing the nonlinear polyester resin (B), and the polymerization catalyst to be used are the same as those described for the above-described linear polyester resin (A).

When at least part of the polycarboxylic acid (x2) and the alcohol component (y) are polycondensed in the above-mentioned first state, the reaction ratio between the (y) and the at least part of the (x2) is preferably set to 2/1 to 1/1, more preferably 1.5/1 to 1.01/1, and particularly preferably 1.3/1 to 1.02/1, expressed by an equivalent ratio [OH]/[COOH] of a hydroxyl group to a carboxylic group.

The reaction ratio between the whole alcohol component (y) and the whole carboxylic acid component (x) to be used for the production of the (B) is preferably set to 2/1 to 1/2, more preferably 1.5/1 to 1/1.3, and particularly preferably 1.3/1 to 1/1.2, expressed by an equivalent ratio [OH]/[COOH] of a hydroxyl group to a carboxylic group.

The SP value of the nonlinear polyester resin (B) is preferably 11.5 to 13.0, and more preferably 11.7 to 12.8.

When the SP value is 11.5 or more, fixing property (on a higher temperature side) is better, whereas when it is 13.0 or less, blocking resistance improves.

The glass transition temperature [Tg] of the nonlinear polyester resin (B) is preferably 45° C. to 75° C., more preferably 50° C. to 70° C. When the Tg is 75° C. or lower, low-temperature fixing property improves. When the Tg is 45° C. or higher, blocking resistance is good.

The softening point [Tm] of the (B), which is not particularly limited, is preferably 90° C. to 170° C., more preferably 120° C. to 160° C. When the Tm is 90° C. or higher, hot offset resistance is good, whereas when it is 170° C. or lower, fixing property is good.

The Mp of the THF-soluble content of the nonlinear polyester resin (B) is preferably 3000 to 30000, more preferably 3200 to 25000, and particularly preferably 3500 to 18000.

The THF-insoluble content in the nonlinear polyester resin (B) is preferably 3 to 50% in terms of low-temperature fixing property. The content is more preferably 5 to 40% and particularly preferably 10 to 35%. When the THF-insoluble content is 50% or less, the gloss of an image is good.

The acid value (AV) of the nonlinear polyester resin (B) is preferably 0 to 40, more preferably 1 to 30, and the hydroxyl value (OHV) thereof is preferably 0 to 40, more preferably 0 to 32.

The sum of the acid value and the hydroxyl value of the nonlinear polyester resin (B) is preferably 3 to 40, more preferably 10 to 40, and particularly preferably 15 to 39. When the sum of the acid value and the hydroxyl value is 3 or more, the storage stability is good, whereas when it is 40 or less, the electrification stability is improved.

When the polyester resin (P) contains the linear polyester resin (A) [preferably [P1(A)]] and the nonlinear polyester resin (B) [preferably [P2(B)]], the weight ratio of the (A) to the (B) [(A)/(B); the total is taken as 100] is preferably 10/90 to 90/10, more preferably 20/80 to 80/20 in terms of reconciling low-temperature fixing property, hot offset resistance, and grindability.

The SP value of the polyester resin (P) [preferably composed of the linear polyester resin (A) and the nonlinear polyester resin (B)] contained in the toner binder of the present invention needs to satisfy the following relationship (1) in terms of fixing property and storage stability and it is preferably 11.6 to 12.9.

$$11.5 \leq SP \text{ value } [(\text{cal/cm}^3)^{1/2}] \text{ of } (P) \leq 13.0 \quad (1)$$

When the (P) is composed of two or more polyester resins, the above-mentioned SP value is a value determined by weighted average from the SP values of the respective resins.

The HLB value of the polyester resin (P) needs to satisfy the following relationship (2) in terms of fixing property and storage stability and is preferably 5.3 to 7.0.

$$5.2 \leq HLB \text{ value [according to the Oda method] of } (P) \leq 7.1 \quad (2).$$

When the (P) is composed of two or more polyester resins, the above-mentioned HLB value is a value determined by weighted average from the HLB values of the respective resins.

The HLB (Hydrophile-Lipophile Balance) is herein a measure that indicates the inorganicity/organicity balance; a higher HLB value means higher inorganicity. Calculation is carried out using the Oda method, and by the following relationship:

$$HLB \approx 10 \times \text{inorganicity/organicity} \qquad (5)$$

(see "KAIMEN KASSEIZAI NYUMON" published by Sanyo Chemical Industries, Ltd., 2007, p. 212).

The HLB value can be adjusted by the composition, the used amount, and so on of the carboxylic acid component (x) and the alcohol component (y) as raw materials of the polyester resin (P).

Examples of the method for adjusting the HLB value within the above range include, when the HLB value is reduced, (1) a method that comprises using a hydrophobic monomer in the polyester resin (P) [(P1) and/or (P2)] and adjusting the HLB value by the used amount of the monomer, and (2) a method that comprises reducing terminal polar functional groups (hydroxyl groups, carboxyl groups, and the like) in the polyester resin (P) [(P1) and/or (P2)].

Specific examples of (2) include a method of esterifying 5 molar % or more of terminal hydroxyl groups with a monocarboxylic acid, a method of esterifying 5 molar % or more of terminal carboxyl groups with a monool, and a method of modifying 5 molar % or more of terminal hydroxyl groups to vinyl groups, as described above.

The method (2) is preferred among these, and a method of capping terminal functional groups by esterifying them with a monocarboxylic acid or a monool is more preferred. Particularly preferred is a method of esterifying with a monocarboxylic acid.

The above method is a useful method because the polyester resin (P2), which contains an aliphatic diol (y2) having 2 to 4 carbon atoms in 50 to 95 molar %, tends to have a higher HLB value.

Since the polyester resin (P1) contained in the polyester resin (P), the (P1) containing an adduct (y1) of bisphenol A with 2 to 4 EO molecules in 30 to 100 molar % in the alcohol component (y), is relatively low in HLB value (5.0 or less in many cases) and the polyester resin (P2) containing an aliphatic diol (y2) having 2 to 4 carbon atoms in 50 to 95 molar % in the alcohol component is relatively high in HLB value (6.0 or more in many cases), the HLB value can be adjusted to within the above-mentioned range by the weight ratio of the (P1) to the (P2).

The polyester resins (P1) and (P2) to be used for the present invention are allowed to have HLB within the above-mentioned range, and preferably, in terms of improvement in fixing property and storage stability, at least one of them [preferably (P1)] is one in which 5 molar % or more of terminal hydroxyl groups are esterified with a monocarboxylic acid (x1), one in which 5 molar % or more of terminal carboxyl groups are esterified with a monool, or one in which 5 molar % or more of terminal hydroxyl groups are modified to vinyl groups. Moreover, the carboxylic acid component (x) of at least one of the (P1) and the (P2) [preferably (P1)] preferably includes a monocarboxylic acid (x1) and a polycarboxylic acid (x2).

In terms of low-temperature fixing property, the polyester resins (P1) and (P2) to be used for the present invention preferably have loss elastic moduli at 120° C. [in the present description also denoted by (P1) [G″120] and (P2) [G″120], respectively] (dyn/cm$^2$) satisfying relationship (3), more preferably satisfying relationship (3').

Furthermore, in terms of hot offset resistance, the storage elastic modulus of the (P2) at 180° C. [in the present description also denoted by (P2) [G'180]] (dyn/cm$^2$) preferably satisfies relationship (4), more preferably satisfies relationship (4').

$$100 \geq (P2)[G''120]/(P1)[G''120] \geq 1 \qquad (3)$$

$$80 \geq (P2)[G''120]/(P1)[G''120] \geq 5 \qquad (3')$$

$$(P2)[G'180] \geq 2000 \qquad (4)$$

$$30000 \geq (P2)[G'180] \geq 3000 \qquad (4')$$

When the relationship (4) is satisfied, it is considered that the viscosity is not excessively low in a practical application range even in a high temperature area, so that superior hot offset resistance is achieved in use as a toner.

The loss elastic modulus (G″) of the polyester resin (P1) or (P2) can be increased by a method of increasing the molecular weight thereof.

The storage elastic modulus (G') of the polyester resin (P2) can be increased by increasing the Tm of the (P2), increasing the proportion of a tri- or higher valent constituent to increase the number of crosslinking sites, increasing the molecular weight, and/or increasing the Tg.

In the present invention, the storage elastic modulus (G') and the loss elastic modulus (G″) are measured under the following conditions by using the following viscoelasticity measurement apparatus.

Apparatus: ARES-24A (manufactured by Rheometric Scientific)
Jig: 25-mmφ parallel plate
Frequency: 1 Hz
Strain factor: 5%
Temperature elevation rate: 5° C./min.

The toner binder of the present invention may contain an additional resin other than the polyester resin (P) unless the effect of the present invention is impaired. Examples of the additional resin include vinyl resins [copolymers of styrene and alkyl(meth)acrylate, copolymers of styrene and a diene monomer, and the like], epoxy resins (ring opening polymerization products of bisphenol A diglycidyl ether, and the like), and urethane resins [polyaddition products of the above-mentioned alcohol component (y) and a diisocyanate, and the like].

The Mp of the additional resin is preferably 300 to 100000.

The mixability of the (P1) and the (P2) in the polyester resin (P) can be evaluated by observation at a magnification of ×100 or more (preferably ×100 to ×5000) with a phase contrast microscope and a digital microscope (a high resolution optical microscope). Since the toner particle diameter is usually about 5 to about 10 μm, in the case where the (P1) and the (P2) form a sea-island structure, the mixability is judged good if the dispersion particle diameter of the island phase is 5 μm or less. The dispersion particle diameter is more preferably 4 μm or less and particularly preferably 0.1 to 3 μm. If the dispersion particle diameter is 5 μm or less, the low-temperature fixing property and the hot offset resistance are good.

Hereinbefore and hereinafter, the mixability is measured and evaluated by using a phase contrast microscope (an inverted research microscope) IX71 manufactured by OLYMPUS and/or a digital microscope (high resolution zoom lens VH-Z500R/Z 500W) manufactured by KEYENCE Corporation.

The toner binder of the present invention can be processed into a toner of the present invention by adding a coloring agent and, as necessary, one or more additives such as a release agent, a charge controlling agent, a magnetic powder, and a fluidizer.

Any dyes, pigments, and the like used as coloring agents for toners may be used as the colorant. Specific examples thereof include carbon black, iron black, Sudan black SM, Fast Yellow G, Benzidine Yellow, Pigment Yellow, Indo Fast Orange, Irgazin Red, Paranitroaniline Red, Toluidine Red, Carmine FB, Pigment Orange R, Lake Red 2G, Rhodamine FB, Rhodamine B Lake, Methylviolet B Lake, Phthalocyanine Blue, Pigment Blue, Brilliant Green, Phthalocyanine Green, Oil Yellow GG, Kayaset YG, Orasol Brown B, and Oil Pink OP, and these may be used singly or two or more of them may be used as a mixture.

As necessary, magnetic powders (powders of ferromagnetic metals such as iron, cobalt and nickel, or such compounds as magnetite, hematite, and ferrite) may be added for also serving as a colorant.

Preferred as the release agent are those having a softening point [Tm] of 50 to 170° C., examples of which include polyolefin waxes, natural waxes, aliphatic alcohols having 30 to 50 carbon atoms, fatty acids having 30 to 50 carbon atoms, and mixtures thereof. Examples of the polyolefin wax includes (co)polymers of olefins (e.g., ethylene, propylene, 1-butene, isobutylene, 1-hexene, 1-dodecene, 1-octadecene, and mixtures thereof) [including those obtained by (co) polymerization and thermo-degradation type polyolefins], oxides with oxygen and/or ozone of (co)polymers of olefins, maleic acid-modified ones of (co)polymers of olefins [e.g., ones modified with maleic acid and derivatives thereof (maleic anhydride, monomethyl maleate, monobutyl maleate, dimethyl maleate, and the like)], copolymers of olefins and unsaturated carboxylic acids [(meth)acrylic acid, itaconic acid, maleic anhydride, and the like] and/or unsaturated carboxylic acid alkyl esters [(meth)acrylic acid alkyl (alkyl group having 1 to 18 carbon atoms) esters, maleic acid alkyl (alkyl group having 1 to 18 carbon atoms) esters, and the like], and Fischer-Tropsch wax.

Examples of the natural waxes include carnauba wax, montan wax, paraffin wax, and rice wax. Examples of the aliphatic alcohols having 30 to 50 carbon atoms include triacontanol. Examples of the fatty acids having 30 to 50 carbon atoms include triacontanoic acid.

Examples of the charge controlling agent include nigrosine dyes, triphenylmethane dyes containing a tertiary amine as a side chain, quaternary ammonium salts, polyamine resins, imidazole derivatives, quaternary ammonium salt group-containing polymers, metal-containing azo dyes, copper phthalocyanine dyes, salicylic acid metal salts, boron complexes of benzilic acid, sulfonic acid group-containing polymers, fluorine-containing polymers, and halogen-substituted aromatic ring-containing polymers.

Examples of the fluidizer include colloidal silica, alumina powder, titanium oxide powder and calcium carbonate powder.

In the composition ratio of the toner of the present invention, based on the toner weight, the toner binder of the present invention is preferably in a range from 30 to 97%, more preferably from 40 to 95%, and particularly preferably from 45 to 92%; the colorant is preferably in a range from 0.05 to 60%, more preferably from 0.1 to 55%, and particularly preferably from 0.5 to 50%; among additives, the release agent is preferably in a range from 0 to 30%, more preferably from 0.5 to 20%, and particularly preferably from 1 to 10%; the charge controlling agent is preferably in a range from 0 to 20%, more preferably from 0.1 to 10%, and particularly preferably from 0.5 to 7.5%; the fluidizer is preferably in a range from 0 to 10%, more preferably from 0 to 5%, and particularly preferably from 0.1 to 4%. The total content of the additives is preferably 3 to 70%, more preferably 4 to 58%, particularly preferably 5 to 50%. With the composition ratio of the toner falling within the above range, those having good chargeability can be readily obtained.

The toner may be obtained by any conventionally known method such as a kneading pulverization method, a phase-change emulsion method, and a polymerization method. For example, in the case where a toner is obtained by using a kneading pulverization method, components other than a fluidizer that constitute the toner are dry-blended, then melt-kneaded, then coarsely pulverized, finally formed into fine particles by using a jet mill pulverizer or the like, further classified to form fine particles preferably having a particle diameter (D50) within the range of from 5 to 20 µm, and mixed with a fluidizer, so that the toner can be produced. The average particle diameter (D50) (when particles whose particle diameters are larger than a certain particle diameter account for 50% in number of all particles in the volume particle diameter distribution of a powder, the certain particle diameter is defined as D50) is measured by using a Coulter counter [e.g., commercial name: Multisizer III (manufactured by Coulter)].

In the case where a toner is obtained by using a phase-change emulsion method, components other than a fluidizer that constitute the toner are dissolved or dispersed in an organic solvent, emulsified by, for example, adding water thereto, and separated and then classified, so that the toner can be produced. The volume average particle diameter of the toner is preferably 3 to 15 µm.

The toner of the present invention using the toner binder of the present invention is, as necessary, mixed with carrier particles such as iron powders, glass beads, nickel powders, ferrite, magnetite, and ferrite with the surface thereof being coated with a resin (an acrylic resin, a silicone resin, and the like), and then used as a developer for an electrostatic latent image. The weight ratio of the toner to the carrier particle is preferably 1/99 to 100/0. It is also possible to form an electric latent image by friction with such a member as a charged blade instead of the carrier particles.

The toner of the present invention is fabricated into a recording material by being fixed on a supporting material (paper, polyester film, and the like) by a copier, a printer, or the like. The method for fixing it onto a supporting material may include known methods such as a heat roll fixing method and a flash fixing method.

EXAMPLES

The present invention is further described below with reference to Examples, but the invention is not limited thereto. In the following, parts are by weight.

Production Example 1

Production of 90% Pure Adduct of Bisphenol a with 2 EO Molecules

A reaction tank equipped with a stirrer and a nitrogen introduction tube was charged with 500 parts of an adduct of bisphenol A with EO (NEWPOL BPE-20 produced by Sanyo Chemical Industries, Ltd.; the purity of the adduct with 2 EO molecules: about 81%) and then the temperature was raised to 120° C. The adduct was dissolved at 120° C., and then the solution was cooled to 100° C. Thereto was charged 500 parts of ion exchange water at 100° C., followed by stirring at 100° C. for 1 hour, and then the upper aqueous phase was drawn off. This was repeated three times, and then water was removed at 130° C. under a reduced pressure of 0.5 to 2.5 kPa for 4 hours, affording a 90% pure adduct of bisphenol A with 2 EO molecules containing an adduct of bisphenol A with one EO molecule in an amount of 1.2%.

Production Example 2

Production of 95% Pure Adduct of Bisphenol A with 2 EO Molecules

A pressurized reaction tank equipped with a stirrer and a nitrogen introduction tube was charged with 277 parts of bisphenol A, 138.5 parts of ion exchange water and 2 parts of triethylamine, followed by flushing with nitrogen twice. Then, the temperature was raised to 130° C. and 123 parts of EO was dropped over 2 hours under a pressure of 0.3 MPa. Then, the mixture was allowed to react for 2 hours and then taken out. Subsequently, water was removed under a reduced pressure of 0.5 to 2.5 kPa at 130° C. for 4 hours, affording a 95% pure adduct of bisphenol A with 2 EO molecules containing an adduct of bisphenol A with one EO molecule in an amount of 0.5%.

Production Example 3

Production of Adduct of Bisphenol A with 3 EO Molecules

A pressurized reaction tank equipped with a stirrer and a nitrogen introduction tube was charged with 277 parts of bisphenol A, 138.5 parts of ion exchange water and 2 parts of triethylamine, followed by flushing with nitrogen twice. Then, the temperature was raised to 130° C. and 176 parts of EO was dropped over 2 hours under a pressure of 0.3 MPa. Then, the mixture was allowed to react for 2 hours and then taken out. Subsequently, water was removed under a reduced pressure of 0.5 to 2.5 kPa at 130° C. for 4 hours, affording an adduct of bisphenol A with 3 EO molecules containing an adduct of bisphenol A with one EO molecule in an amount of 0.1%, an adduct of bisphenol A with 2 EO molecules in an amount of 18%, an adduct of bisphenol A with 3 EO molecules in an amount of 69%, and an adduct of bisphenol A with 4 EO molecules in an amount of 13%.

Production Example 4

Synthesis of Linear Polyester Resin [P1(A)-1]

Into a reaction tank equipped with a condenser, a stirrer and a nitrogen introduction tube (the reaction tanks used in the following Production Examples also are of the same configuration) were loaded 305 parts (81.2 molar %) of terephthalic acid, 41 parts (14.8 molar %) of benzoic acid, 706 parts (100.0 molar %) of the 95% pure adduct of bisphenol A with 2 EO molecules obtained in Production Example 2, and 2 parts of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.5 to 2.5 kPa until an acid value of 2 or less was achieved. Subsequently, 17 parts (3.9 molar %) of trimellitic anhydride was added at 180° C. and allowed to react under normal pressure for 1 hour, and then the resultant was taken out. The resulting resin was cooled to room temperature, and then pulverized into particles. This is named linear polyester resin [P1(A)-1].

[P1(A)-1] had an Mp of 6200, an Mn of 2300, a Tg of 61° C., a Tm of 100° C., an acid value of 10, a hydroxyl value of 17, a THF-insoluble content of 1%, an SP value of 11.4, an HLB value of 4.3, and an esterification ratio of terminal hydroxyl groups with a monocarboxylic acid of 45 molar %.

Molar % within parentheses means the molar % of each raw material in a carboxylic acid component or in an alcohol component. The same is applied hereinafter.

Production Example 5

Synthesis of Linear Polyester Resin [P1(A)-2]

Into a reaction tank were loaded 316 parts (85.7 molar %) of terephthalic acid, 28 parts (10.3 molar %) of benzoic acid, 709 parts (100.0 molar %) of the 95% pure adduct of bisphenol A with 2 EO molecules obtained in Production Example 2, and 2.5 parts of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.5 to 2.5 kPa until an acid value of 2 or less was achieved. Subsequently, 17 parts (4.0 molar %) of trimellitic anhydride was added at 180° C. and allowed to react under normal pressure for 1 hour, and then the resultant was taken out. The resulting resin was cooled to room temperature, and then pulverized into particles. This is named linear polyester resin [P1(A)-2].

[P1(A)-2] had an Mp of 7800, an Mn of 2700, a Tg of 64° C., a Tm of 105° C., an acid value of 10, a hydroxyl value of 15, a THF-insoluble content of 1%, an SP value of 11.5, an HLB value of 4.3, and an esterification ratio of terminal hydroxyl groups with a monocarboxylic acid of 36 molar %.

Production Example 6

Synthesis of Linear Polyester Resin [P1(A)-3]

Into a reaction tank were loaded 303 parts (81.0 molar %) of terephthalic acid, 31 parts (11.1 molar %) of benzoic acid, 700 parts (100.0 molar %) of the 95% pure adduct of bisphenol A with 2 EO molecules obtained in Production Example 2, and 2.5 parts of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.5 to 2.5 kPa until an acid value of 2 or less was achieved. Subsequently, 34 parts (7.9 molar %) of trimellitic anhydride was added at 180° C. and allowed to react under normal pressure for 1 hour, and then the resultant was taken out. The resulting resin was cooled to room temperature, and then pulverized into particles. This is named linear polyester resin [P1(A)-3].

[P1(A)-3] had an Mp of 6400, an Mn of 2400, a Tg of 64° C., a Tm of 105° C., an acid value of 20, a hydroxyl value of 15, a THF-insoluble content of 1%, an SP value of 11.5, an HLB value of 4.5, and an esterification ratio of terminal hydroxyl groups with a monocarboxylic acid of 34 molar %.

Production Example 7

Synthesis of Linear Polyester Resin [P1(A)-4]

Into a reaction tank were loaded 285 parts (58.1 molar %) of terephthalic acid, 122 parts (24.9 molar %) of isophthalic acid, 51 parts (14.0 molar %) of benzoic acid, 547 parts (60.0 molar %) of the 90% pure adduct of bisphenol A with 2 EO molecules obtained in Production Example 1, 198 parts (40.0 molar % with exclusion of 126 parts of the recovery mentioned below) of ethylene glycol, and 2.5 parts of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.5 to 2.5 kPa for 1 hour. Subsequently, 17 parts (3.0 molar %) of trimellitic anhydride was added at 180° C. and allowed to react under normal pressure for 1 hour, and then the resultant was taken out. The amount of the recovered ethylene glycol was 262 parts. The resulting resin was cooled to room temperature, and then pulverized into particles. This is named linear polyester resin [P1(A)-4].

[P1(A)-4] had an Mp of 5600, an Mn of 2300, a Tg of 62° C., a Tm of 104° C., an acid value of 10, a hydroxyl value of 13, a THF-insoluble content of 1%, an SP value of 11.7, an HLB value of 4.9, and an esterification ratio of terminal hydroxyl groups with a monocarboxylic acid of 52 molar %.

Production Example 8

Synthesis of Linear Polyester Resin [P1(A)-5]

Into a reaction tank were loaded 153 parts (40.6 molar %) of terephthalic acid, 153 parts (40.6 molar %) of isophthalic acid, 41 parts (14.9 molar %) of benzoic acid, 706 parts (100.0 molar %) of the 90% pure adduct of bisphenol A with 2 EO molecules obtained in Production Example 1, and 2.5 parts of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.5 to 2.5 kPa for 1 hour. Subsequently, 17 parts (3.9 molar %) of trimellitic anhydride was added at 180° C. and allowed to react under normal pressure for 1 hour, and then the resultant was taken out. The resulting resin was cooled to room temperature, and then pulverized into particles. This is named linear polyester resin [P1(A)-5].

[P1(A)-5] had an Mp of 6200, an Mn of 2300, a Tg of 59° C., a Tm of 99° C., an acid value of 10, a hydroxyl value of 16, a THF-insoluble content of 1%, an SP value of 11.4, an HLB value of 4.3, and an esterification ratio of terminal hydroxyl groups with a monocarboxylic acid of 45 molar %.

Production Example 9

Synthesis of Linear Polyester Resin [P1(A)-6]

Into a reaction tank were loaded 245 parts (65.8 molar %) of terephthalic acid, 55 parts (16.4 molar %) of phthalic anhydride, 39 parts (9.9 molar %) of p-tert-butyl benzoate, 697 parts (100.0 molar %) of the 95% pure adduct of bisphenol A with 2 EO molecules obtained in Production Example 2, and 2.5 parts of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.5 to 2.5 kPa for 1 hour. Subsequently, 34 parts (7.9 molar %) of trimellitic anhydride was added at 180° C. and allowed to react under normal pressure for 1 hour, and then the resultant was taken out. The resulting resin was cooled to room temperature, and then pulverized into particles. This is named linear polyester resin [P1(A)-6].

[P1(A)-6] had an Mp of 7600, an Mn of 2600, a Tg of 62° C., a Tm of 101° C., an acid value of 20, a hydroxyl value of 14, a THF-insoluble content of 1%, an SP value of 11.4, an HLB value of 4.4, and an esterification ratio of terminal hydroxyl groups with a monocarboxylic acid of 36 molar %.

Production Example 10

Synthesis of Linear Polyester Resin [P1(A)-7]

Into a reaction tank were loaded 400 parts (87.2 molar %) of terephthalic acid, 32 parts (9.6 molar %) of benzoic acid, 558 parts (62.0 molar %) of the 95% pure adduct of bisphenol A with 2 EO molecules obtained in Production Example 2, 232 parts (38.0 molar % with exclusion of 150 parts of the recovery mentioned below) of 1,2-propylene glycol, and 2.5 parts of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.5 to 2.5 kPa for 1 hour. Subsequently, 17 parts (2.7 molar %) of trimellitic anhydride was added at 180° C. and allowed to react under normal pressure for 1 hour, and then the resultant was taken out. The amount of the recovered 1,2-propylene glycol was 150 parts. The resulting resin was cooled to room temperature, and then pulverized into particles. This is named linear polyester resin [P1(A)-7].

[P1(A)-7] had an Mp of 5000, an Mn of 2200, a Tg of 62° C., a Tm of 106° C., an acid value of 10, a hydroxyl value of 28, a THF-insoluble content of 1%, an SP value of 11.6, an HLB value of 4.9, and an esterification ratio of terminal hydroxyl groups with a monocarboxylic acid of 33 molar %.

Production Example 11

Synthesis of linear polyester resin [P1(A)-8]

Into a reaction tank were loaded 298 parts (85.1 molar %) of terephthalic acid, 28 parts (10.7 molar %) of benzoic acid, 345 parts (50.0 molar %) of the 95% pure adduct of bisphenol A with 2 EO molecules obtained in Production Example 2, 378 parts (50.0 molar %) of an adduct of bisphenol A with 2 propylene oxide (hereinafter abbreviated as PO) molecules (NEWPOL BP-2P produced by Sanyo Chemical Industries, Ltd.), and 2.5 parts of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.5 to 2.5 kPa until an acid value of 2 or less was achieved. Subsequently, 17 parts (4.2 molar %) of trimellitic anhydride was added at 180° C. and allowed to react under normal pressure for 1 hour, and then the resultant was taken out. The resulting resin was cooled to room temperature, and then pulverized into particles. This is named linear polyester resin [P1(A)-8].

[P1(A)-8] had an Mp of 6900, an Mn of 2500, a Tg of 64° C., a Tm of 105° C., an acid value of 10, a hydroxyl value of 23, a THF-insoluble content of 1%, an SP value of 11.3, an HLB value of 4.3, and an esterification ratio of terminal hydroxyl groups with a monocarboxylic acid of 31 molar %.

Production Example 12

Synthesis of linear polyester resin [P1(A)-9]

Into a reaction tank were loaded 211 parts (63.7 molar %) of terephthalic acid, 90 parts (27.3 molar %) of isophthalic acid, 679 parts (92.2 molar %) of the 95% pure adduct of bisphenol A with 2 EO molecules obtained in Production Example 2, 49 parts (7.8 molar %) of stearyl alcohol, and 2.5 parts of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.5 to 2.5 kPa until an acid value of 2 or less was achieved. Subsequently, 34 parts (8.9 molar %) of trimellitic anhydride was added at 180° C. and allowed to react under normal pressure for 1 hour, and then the resultant was taken out. The resulting resin was cooled to room temperature, and then pulverized into particles. This is named linear polyester resin [P1(A)-9].

[P1(A)-9] had an Mp of 6200, an Mn of 2300, a Tg of 60° C., a Tm of 101° C., an acid value of 20, a hydroxyl value of 30, a THF-insoluble content of 1%, an SP value of 11.4, an HLB value of 4.6, and an esterification ratio of terminal carboxyl groups with a monool of 13 molar %.

Production Example 13

Synthesis of Linear Polyester Resin [P1(A)-10]

Into a reaction tank were loaded 298 parts (81.2 molar %) of terephthalic acid, 40 parts (14.8 molar %) of benzoic acid, 713 parts (100 molar %) of an adduct of bisphenol A with EO (NEWPOL BPE-20 produced by Sanyo Chemical Industries, Ltd.; the purity of an adduct with 2 EO molecules: about 81%), and 2.5 parts of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.5 to 2.5 kPa for 1 hour. Subsequently, 17 parts (4.0 molar %) of trimellitic anhydride was added at 180° C. and allowed to react under normal pressure for 1 hour, and then the resultant was taken out. The resulting resin was cooled to room temperature, and then pulverized into particles. This is named linear polyester resin [P1(A)-10].

[P1(A)-10] had an Mp of 6300, an Mn of 2400, a Tg of 56° C., a Tm of 96° C., an acid value of 10, a hydroxyl value of 20, a THF-insoluble content of 1%, an SP value of 11.5, an HLB value of 4.3, and an esterification ratio of terminal hydroxyl groups with a monocarboxylic acid of 42 molar %.

Production Example 14

Synthesis of Linear Polyester Resin [P1(A)-11]

Into a reaction tank were loaded 286 parts (84.0 molar %) of terephthalic acid, 24 parts (9.5 molar %) of benzoic acid, 447 parts (60 molar %) of the adduct of bisphenol A with 3 EO molecules obtained in Production Example 3, 282 parts (40.0 molar %) of an adduct of bisphenol A with 2 PO molecules (NEWPOL BP-2P produced by Sanyo Chemical Industries, Ltd.), and 2.5 parts of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.5 to 2.5 kPa for 1 hour. Subsequently, 26 parts (6.5 molar %) of trimellitic anhydride was added at 180° C. and allowed to react under normal pressure for 1 hour, and then the resultant was taken out. The resulting resin was cooled to room temperature, and then pulverized into particles. This is named linear polyester resin [P1(A)-11].

[P1(A)-11] had an Mp of 8000, an Mn of 3100, a Tg of 62° C., a Tm of 108° C., an acid value of 15, a hydroxyl value of 18, a THF-insoluble content of 1%, an SP value of 11.2, an HLB value of 4.4, and an esterification ratio of terminal hydroxyl groups with a monocarboxylic acid of 36 molar %.

Production Example 15

Synthesis of Nonlinear Polyester Resin [P2(B)-1]

Into a reaction tank were loaded 567 parts (68.8 molar %) of terephthalic acid, 243 parts (29.5 molar %) of isophthalic acid, 557 parts (85.0 molar % with exclusion of 287 parts of the recovery mentioned below) of ethylene glycol, 80 parts (15.0 molar %) of neopentyl glycol, and 2.5 parts of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.5 to 2.5 kPa for 1 hour. Subsequently, 16 parts (1.7 molar %) of trimellitic anhydride was added, and after being allowed to react under normal pressure for 1 hour, the mixture was further allowed to react under a reduced pressure of 2.5 to 5 kPa, and then the resultant was taken out at a softening point of 143° C. The amount of the recovered ethylene glycol was 287 parts. The resulting resin was cooled to room temperature, and then pulverized into particles. This is named nonlinear polyester resin [P2(B)-1].

[P2(B)-1] had an Mp of 17500, an Mn of 5400, a Tg of 64° C., a Tm of 143° C., an acid value of 1, a hydroxyl value of 14, a THF-insoluble content of 3%, an SP value of 12.3, and an HLB value of 6.8.

Production Example 16

Synthesis of Nonlinear Polyester Resin [P2(B)-2]

Into a reaction tank were loaded 368 parts (51.7 molar %) of terephthalic acid, 158 parts (22.1 molar %) of isophthalic acid, 355 parts (85.0 molar % with exclusion of 137 parts of the recovery mentioned below) of ethylene glycol, 215 parts (15.0 molar %) of an adduct of bisphenol A with 2 PO molecules (NEWPOL BP-2P produced by Sanyo Chemical Industries, Ltd.), and 0.5 parts of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.5 to 2.5 kPa for 1 hour. Subsequently, 70 parts (13.3 molar %) of benzoic acid was added and then allowed to react under normal pressure for 3 hours. Moreover, 107 parts (12.9 molar %) of trimellitic anhydride was added, and after being allowed to react under normal pressure for 1 hour, the mixture was further allowed to react under a reduced pressure of 2.5 to 5 kPa, and then the resultant was taken out at a softening point of 155° C. The amount of the recovered ethylene glycol was 137 parts. The resulting resin was cooled to room temperature, and then pulverized into particles. This is named nonlinear polyester resin [P2(B)-2].

[P2(B)-2] had an Mp of 4800, an Mn of 1700, a Tg of 63° C., a Tm of 155° C., an acid value of 20, a hydroxyl value of 1, a THF-insoluble content of 25%, an SP value of 12.0, an HLB value of 6.2, and an esterification ratio of terminal hydroxyl groups with a monocarboxylic acid of 26 molar %.

Production Example 17

Synthesis of Nonlinear Polyester Resin [P2(B)-3]

Into a reaction tank were loaded 377 parts (51.1 molar %) of terephthalic acid, 162 parts (21.9 molar %) of isophthalic acid, 199 parts (15.0 molar %) of the 95% pure adduct of bisphenol A with 2 EO molecules obtained in Production Example 2, 367 parts (85.0 molar % with exclusion of 147 parts of the recovery mentioned below) of ethylene glycol, and 1 part of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.5 to 2.5 kPa for 1 hour. Subsequently, 74 parts (13.7 molar %) of benzoic acid was added and then allowed to react under normal pressure for 3 hours. Moreover, 114 parts (13.3 molar %) of trimellitic anhydride was added, and after being allowed to react under normal pressure for 1 hour, the mixture was further allowed to react under a reduced pressure of 2.5 to 5 kPa, and then the resultant was taken out at a softening point of 158° C. The amount of the recovered ethylene glycol was 147 parts. The resulting resin was cooled to room temperature, and then pulverized into particles. This is named nonlinear polyester resin [P2(B)-3].

[P2(B)-3] had an Mp of 5000, an Mn of 2000, a Tg of 61° C., a Tm of 158° C., an acid value of 24, a hydroxyl value of 2, a THF-insoluble content of 28%, an SP value of 12.1, an HLB value of 6.3, and an esterification ratio of terminal hydroxyl groups with a monocarboxylic acid of 33 molar %.

Production Example 18

Synthesis of Nonlinear Polyester Resin [P2(B)-4]

Into a reaction tank were loaded 229 parts (42.3 molar %) of terephthalic acid, 223 parts (42.3 molar %) of isophthalic acid, 265 parts (65.0 molar % with exclusion of 122 parts of the recovery mentioned below) of ethylene glycol, 431 parts (35.0 molar %) of an adduct of bisphenol A with 2 PO molecules (NEWPOL BP-2P produced by Sanyo Chemical Industries, Ltd.), and 2.5 parts of titanium diisopropoxybis-triethanolaminate as a polymerization catalyst, and these were allowed to react with one another at 210° C. under a nitrogen gas flow for 5 hours while generated water being distilled off, and then further allowed to react under a reduced pressure of 0.5 to 2.5 kPa for 1 hour. Subsequently, 30 parts (7.6 molar %) of benzoic acid was added and then allowed to react under normal pressure for 3 hours. Moreover, 49 parts (8.0 molar %) of trimellitic anhydride was added, and after being allowed to react under normal pressure for 1 hour, the mixture was further allowed to react under a reduced pressure of 2.5 to 5 kPa, and then the resultant was taken out at a softening point of 135° C. The amount of the recovered ethylene glycol was 122 parts. The resulting resin was cooled to room temperature, and then pulverized into particles. This is named nonlinear polyester resin [P2(B)-4].

[P2(B)-4] had an Mp of 7500, an Mn of 3100, a Tg of 63° C., a Tm of 135° C., an acid value of 1, a hydroxyl value of 31, a THF-insoluble content of 3%, an SP value of 11.7, an HLB value of 5.4, and an esterification ratio of terminal hydroxyl groups with a monocarboxylic acid of 48 molar %.

Production Example 19

Synthesis of Nonlinear Polyester Resin [P2(B)-5]

Into a reaction tank were loaded 519 parts (74.0 molar %) of terephthalic acid, 12 parts (1.9 molar %) of adipic acid, 143 parts (10 molar %) of the 95% pure adduct of bisphenol A with 2 EO molecules obtained in Production Example 2, 465 parts (90 molar % with exclusion of 158 parts of the recovery mentioned below) of 1,2-propylene glycol, and 2.5 parts of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.5 to 2.5 kPa for 1 hour. Subsequently, 75 parts (14.5 molar %) of benzoic acid was added and then allowed to react under normal pressure for 3 hours. Moreover, 78 parts (9.6 molar %) of trimellitic anhydride was added, and after being allowed to react under normal pressure for 1 hour, the mixture was further allowed to react under a reduced pressure of 2.5 to 5 kPa, and then the resultant was taken out at a softening point of 150° C. The amount of the recovered 1,2-propylene glycol was 158 parts. The resulting resin was cooled to room temperature, and then pulverized into particles. This is named nonlinear polyester resin [P2(B)-5].

[P2(B)-5] had an Mp of 5900, an Mn of 3000, a Tg of 66° C., a Tm of 150° C., an acid value of 15, a hydroxyl value of 7, a THF-insoluble content of 21%, an SP value of 12.0, an HLB value of 6.9, and an esterification ratio of terminal hydroxyl groups with a monocarboxylic acid of 18 molar %.

Production Example 20

Synthesis of Nonlinear Polyester Resin [P2(B)-6]

Into a reaction tank were loaded 293 parts (48.0 molar %) of terephthalic acid, 126 parts (20.6 molar %) of isophthalic acid, 250 parts (70.0 molar % with exclusion of 98 parts of the recovery mentioned below) of ethylene glycol, 367 parts (30.0 molar %) of an adduct of bisphenol A with 2 PO molecules (NEWPOL BP-2P produced by Sanyo Chemical Industries, Ltd.), and 0.5 parts of titanium diisopropoxybis-triethanolaminate as a polymerization catalyst, and these were allowed to react with one another at 210° C. under a nitrogen gas flow for 5 hours while generated water being distilled off, and then further allowed to react under a reduced pressure of 0.5 to 2.5 kPa for 1 hour. Subsequently, 77 parts (17.1 molar %) of benzoic acid was added and then allowed to react under normal pressure for 3 hours. Moreover, 101 parts (14.4 molar %) of trimellitic anhydride was added, and after being allowed to react under normal pressure for 1 hour, the mixture was further allowed to react under a reduced pressure of 2.5 to 5 kPa, and then the resultant was taken out at a softening point of 155° C. The amount of the recovered ethylene glycol was 98 parts. The resulting resin was cooled to room temperature, and then pulverized into particles. This is named nonlinear polyester resin [P2(B)-6].

[P2(B)-6] had an Mp of 5200, an Mn of 2500, a Tg of 62° C., a Tm of 155° C., an acid value of 17, a hydroxyl value of 18, a THF-insoluble content of 25%, an SP value of 11.7, an HLB value of 5.7, and an esterification ratio of terminal hydroxyl groups with a monocarboxylic acid of 49 molar %.

Comparative Production Example 1

[Synthesis of Comparative Linear Polyester Resin (RP1-1) (with Composition Similar to P1)]

Into a reaction tank were loaded 364 parts (53.4 molar %) of terephthalic acid, 243 parts (35.6 molar %) of isophthalic acid, 33 parts (6.6 molar %) of benzoic acid, 453 parts (80 molar % with exclusion of 255 parts of the recovery mentioned below) of ethylene glycol, 262 parts (20 molar %) of an adduct of bisphenol A with EO (NEWPOL BPE-20 produced by Sanyo Chemical Industries, Ltd.), and 2.5 parts of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.5 to 2.5 kPa for 1 hour. Subsequently, 34 parts (4.3 molar %) of trimellitic anhydride was added at 180° C. and allowed to react under normal pressure for 1 hour, and then the resultant was taken out. The amount of the recovered ethylene glycol was 255 parts. The resulting resin was cooled to room temperature, and then pulverized into particles. This is named linear polyester resin (RP1-1).

(RP1-1) had an Mp of 7200, an Mn of 2600, a Tg of 58° C., a Tm of 106° C., an acid value of 20, a hydroxyl value of 14, a THF-insoluble content of 1%, an SP value of 12.1, an HLB value of 6.2, and an esterification ratio of terminal hydroxyl groups with a monocarboxylic acid of 41 molar %.

Comparative Production Example 2

[Synthesis of Comparative Linear Polyester Resin (RP1-2) (with Composition Similar to P1)]

Into a reaction tank were loaded 210 parts (65.3 molar %) of terephthalic acid, 61 parts (21.7 molar %) of adipic acid, 14 parts (6.1 molar %) of benzoic acid, 260 parts (38.0 molar %) of an adduct of bisphenol A with 2 PO molecules (NEWPOL BP-2P produced by Sanyo Chemical Industries, Ltd.), 489 parts (62.0 molar %) of an adduct of bisphenol A with 3 PO molecules (NEWPOL BP-3P produced by Sanyo Chemical Industries, Ltd.), and 2.5 parts of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.5 to 2.5 kPa for 1 hour. Subsequently, 26 parts (6.9 molar %) of trimellitic anhydride was added at 180° C. and allowed to react under normal pressure for 1 hour, and then the resultant was taken out. The resulting resin was cooled to room temperature, and then pulverized into particles. This is named linear polyester resin (RP1-2).

(RP1-2) had an Mp of 7400, an Mn of 3500, a Tg of 59° C., a Tm of 100° C., an acid value of 15, a hydroxyl value of 18, a THF-insoluble content of 1%, an SP value of 10.8, an HLB value of 4.3, and an esterification ratio of terminal hydroxyl groups with a monocarboxylic acid of 22 molar %.

Comparative Production Example 3

[Synthesis of Comparative Nonlinear Polyester Resin (RP2-1) (with Composition Similar to P2)]

Into a reaction tank were loaded 411 parts (48.1 molar %) of terephthalic acid, 274 parts (32.0 molar %) of isophthalic acid, 512 parts (100.0 molar %) of ethylene glycol, and 3 parts of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.5 to 2.5 kPa for 1 hour. Subsequently, 50 parts (8.0 molar %) of benzoic acid was added and then allowed to react under normal pressure for 3 hours. Moreover, 117 parts (11.9 molar %) of trimellitic anhydride was added, and after being allowed to react under normal pressure for 1 hour, the mixture was further allowed to react under a reduced pressure of 2.5 to 5 kPa, and then the resultant was taken out at a softening point of 155° C. The amount of the recovered ethylene glycol was 197 parts. The resulting resin was cooled to room temperature, and then pulverized into particles. This is named nonlinear polyester resin (RP2-1).

(RP2-1) had an Mp of 5000, an Mn of 1900, a Tg of 58° C., a Tm of 155° C., an acid value of 27, a hydroxyl value of 7, a THF-insoluble content of 29%, an SP value of 12.6, an HLB value of 7.4, and an esterification ratio of terminal hydroxyl groups with a monocarboxylic acid of 22 molar %.

Comparative Production Example 4

[Synthesis of Comparative Nonlinear Polyester Resin (RP2-2) (with Composition Similar to P2)]

Into a reaction tank were loaded 234 parts (52.2 molar %) of terephthalic acid, 137 parts (34.7 molar %) of adipic acid, 186 parts (40.0 molar % with exclusion of 115 parts of the recovery mentioned below) of ethylene glycol, 593 parts (60.0 molar %) of an adduct of bisphenol A with 2 PO molecules (NEWPOL BP-2P produced by Sanyo Chemical Industries, Ltd.), and 3 parts of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.5 to 2.5 kPa for 1 hour. Subsequently, 20 parts (6.1 molar %) of benzoic acid was added and then allowed to react under normal pressure for 3 hours. Moreover, 36 parts (7.0 molar %) of trimellitic anhydride was added, and after being allowed to react under normal pressure for 1 hour, the mixture was further allowed to react under a reduced pressure of 2.5 to 5 kPa, and then the resultant was taken out at a softening point of 147° C. The amount of the recovered ethylene glycol was 115 parts. The resulting resin was cooled to room temperature, and then pulverized into particles. This is named nonlinear polyester resin (RP2-2).

(RP2-2) had an Mp of 5800, an Mn of 2300, a Tg of 60° C., a Tm of 147° C., an acid value of 12, a hydroxyl value of 35, a THF-insoluble content of 13%, an SP value of 11.2, an HLB value of 4.9, and an esterification ratio of terminal hydroxyl groups with a monocarboxylic acid of 17 molar %.

In Table 1 are summarized main analysis values of the polyester resins [P1(A)-1] to [P1(A)-11], [P2(B)-1] to [P2(B)-6] obtained in Production Examples 4 to 20 and the polyester resins (RP1-1), (RP1-2), (RP2-1), and (RP2-2) obtained in Comparative Production Examples 1 to 4.

TABLE 1

| | | Polyester resin | Mp | Mn | Tg | Tm | AV | OHV | SP value | HLB value | G" 120 | G' 180 |
|---|---|---|---|---|---|---|---|---|---|---|---|---|
| Production Example | 4 | P1(A)-1 | 6,200 | 2,300 | 61 | 100 | 10 | 17 | 11.4 | 4.3 | $1.8 \times 10^4$ | — |
| | 5 | P1(A)-2 | 7,800 | 2,700 | 64 | 105 | 10 | 15 | 11.5 | 4.3 | $2.7 \times 10^4$ | — |
| | 6 | P1(A)-3 | 6,400 | 2,400 | 64 | 105 | 20 | 15 | 11.5 | 4.5 | $2.3 \times 10^4$ | — |
| | 7 | P1(A)-4 | 5,600 | 2,300 | 62 | 104 | 10 | 13 | 11.7 | 4.9 | $2.8 \times 10^4$ | — |
| | 8 | P1(A)-5 | 6,200 | 2,300 | 59 | 99 | 10 | 16 | 11.4 | 4.3 | $2.2 \times 10^4$ | — |
| | 9 | P1(A)-6 | 7,600 | 2,600 | 62 | 101 | 20 | 14 | 11.4 | 4.4 | $2.6 \times 10^4$ | — |
| | 10 | P1(A)-7 | 5,000 | 2,200 | 62 | 106 | 10 | 28 | 11.6 | 4.9 | $1.8 \times 10^4$ | — |
| | 11 | P1(A)-8 | 6,900 | 2,500 | 64 | 105 | 10 | 23 | 11.3 | 4.3 | $2.1 \times 10^4$ | — |
| | 12 | P1(A)-9 | 6,200 | 2,300 | 60 | 101 | 20 | 30 | 11.4 | 4.6 | $1.9 \times 10^4$ | — |
| | 13 | P1(A)-10 | 6,300 | 2,400 | 56 | 96 | 10 | 20 | 11.5 | 4.3 | $1.7 \times 10^4$ | — |
| | 14 | P1(A)-11 | 8,000 | 3,100 | 62 | 108 | 15 | 18 | 11.2 | 4.4 | $2.3 \times 10^4$ | — |
| | 15 | P2(B)-1 | 17,500 | 5,400 | 64 | 143 | 1 | 14 | 12.3 | 6.8 | $1.2 \times 10^6$ | $1.2 \times 10^4$ |
| | 16 | P2(B)-2 | 4,800 | 1,700 | 63 | 155 | 20 | 1 | 12.0 | 6.2 | $2.7 \times 10^5$ | $2.1 \times 10^4$ |
| | 17 | P2(B)-3 | 5,000 | 2,000 | 61 | 158 | 24 | 2 | 12.1 | 6.3 | $2.6 \times 10^5$ | $2.2 \times 10^4$ |
| | 18 | P2(B)-4 | 7,500 | 3,100 | 63 | 135 | 1 | 31 | 11.7 | 5.4 | $3.1 \times 10^5$ | $5.8 \times 10^3$ |
| | 19 | P2(B)-5 | 5,900 | 3,000 | 66 | 150 | 15 | 7 | 12.0 | 6.9 | $3.5 \times 10^5$ | $7.0 \times 10^3$ |
| | 20 | P2(B)-6 | 5,200 | 2,500 | 62 | 155 | 17 | 18 | 11.7 | 5.7 | $2.2 \times 10^5$ | $1.6 \times 10^4$ |
| Comparative Production Example | 1 | RP1-1 | 7,200 | 2,600 | 58 | 106 | 20 | 14 | 12.1 | 6.2 | $2.8 \times 10^4$ | — |
| | 2 | RP1-2 | 7,400 | 3,500 | 59 | 100 | 15 | 18 | 10.8 | 4.3 | $2.5 \times 10^4$ | — |
| | 3 | RP2-1 | 5,000 | 1,900 | 58 | 155 | 27 | 7 | 12.6 | 7.4 | $3.0 \times 10^5$ | $3.1 \times 10^4$ |
| | 4 | RP2-2 | 5,800 | 2,300 | 60 | 147 | 12 | 35 | 11.2 | 4.9 | $2.3 \times 10^5$ | $2.8 \times 10^3$ |

Examples 1 to 16, Comparative Examples 1 to 5

The linear polyester resin [P1(A)], the nonlinear polyester resin [P2(B)], the comparative linear polyester resin (RP1), and the comparative nonlinear polyester resin (RP2) obtained in Production Examples 4 to 20 and Comparative Production Examples 1 to 4 were loaded in the proportions given in Table 2 into a plastomill and stirred at 140° C. for 10 minutes, thereby being melted and mixed. Thus, toner binders (TB-1) to (TB-16) of the present invention made of a polyester resin (P) and comparative toner binders (TB'-1) to (TB'-5) were obtained. To 100 parts of each toner binder were added 8 parts of Cyanine Blue KRO (produced by Sanyo Color Works, Ltd.) and 5 parts of carnauba wax. Toner preparation was carried out by the following method.

First, the resultant was preliminarily mixed using a Henschel mixer [FM10B manufactured by Nippon Coke & Engineering Co., Ltd.], and then kneaded by a twin screw kneader [PCM-30 manufactured by Ikegai Corporation]. Subsequently, after being finely pulverized using a supersonic jet pulverizer Labo Jet [manufactured by Nippon Pneumatic Mfg. Co., Ltd.], the resulting particles were classified by an airflow classifier [MDS-I, manufactured by Nippon Pneumatic Mfg. Co., Ltd.], so that toner particles having a median diameter (D50) by volume of 8 μm were obtained. Subsequently, 0.5 parts of colloidal silica (Aerosil R972; produced by Nippon Aerosil Co., Ltd.) was added to 100 parts of the toner particles and mixed in a sample mill, so that toners (T-1) to (T-16) of the present invention and comparative toners (T'-1) to (T'-5) were obtained.

Physical property values of the polyester resins (P) and the results evaluated using the evaluation methods described below are shown in Table 2.

TABLE 2

| | | | Toner binder | | Physical property of polyester resin (P) | | (P2)[G"120] | Fixing property | |
|---|---|---|---|---|---|---|---|---|---|
| | | Toner No. | A | B | SP value | HLB value | (P1) [G" 120] | MFT, °C. | HOT, °C. |
| Example | 1 | T-1 | TB-1 | P1(A)-1 50 | P2(B)-1 50 | 11.9 | 5.6 | 67 | 125 | 225 |
| | 2 | T-2 | TB-2 | P1(A)-1 50 | P2(B)-2 50 | 11.7 | 5.3 | 15 | 115 | 225 |
| | 3 | T-3 | TB-3 | P1(A)-1 20 | P2(B)-2 80 | 11.9 | 5.8 | 15 | 120 | 230 |
| | 4 | T-4 | TB-4 | P1(A)-1 30 | P2(B)-6 70 | 11.6 | 5.3 | 12 | 125 | 230 |
| | 5 | T-5 | TB-5 | P1(A)-2 30 | P2(B)-2 70 | 11.9 | 5.6 | 10 | 130 | 230 |
| | 6 | T-6 | TB-6 | P1(A)-2 20 | P2(B)-3 80 | 12.0 | 5.9 | 10 | 125 | 230 |
| | 7 | T-7 | TB-7 | P1(A)-3 30 | P2(B)-2 70 | 11.9 | 5.7 | 12 | 120 | 230 |
| | 8 | T-8 | TB-8 | P1(A)-4 50 | P2(B)-4 50 | 11.7 | 5.2 | 11 | 120 | 220 |
| | 9 | T-9 | TB-9 | P1(A)-5 40 | P2(B)-3 60 | 11.8 | 5.5 | 10 | 115 | 215 |
| | 10 | T-10 | TB-10 | P1(A)-6 20 | P2(B)-2 80 | 11.9 | 5.8 | 10 | 125 | 230 |
| | 11 | T-11 | TB-11 | P1(A)-7 60 | P2(B)-5 40 | 11.8 | 5.7 | 19 | 115 | 220 |

TABLE 2-continued

|  |  |  |  |  |  |  |  |  |  |
|---|---|---|---|---|---|---|---|---|---|
|  | 12 | T-12 | TB-12 | P1(A)-7 20 | P2(B)-5 80 | 11.9 | 6.5 | 19 | 125 | 230 |
|  | 13 | T-13 | TB-13 | P1(A)-8 30 | P2(B)-6 70 | 11.6 | 5.3 | 10 | 120 | 230 |
|  | 14 | T-14 | TB-14 | P1(A)-9 50 | P2(B)-3 50 | 11.8 | 5.5 | 14 | 130 | 220 |
|  | 15 | T-15 | TB-15 | P1(A)-10 20 | P2(B)-3 80 | 12.0 | 5.9 | 15 | 130 | 225 |
|  | 16 | T-16 | TB-16 | P1(A)-11 40 | P2(B)-2 60 | 11.7 | 5.5 | 12 | 130 | 220 |
| Comparative Example | 1 | T'-1 | TB'-1 | RP1-1 50 | P2(B)-1 50 | 12.2 | 6.5 | 43 | 140 | 215 |
|  | 2 | T'-2 | TB'-2 | RP1-2 50 | P2(B)-2 50 | 11.4 | 5.3 | 11 | 140 | 195 |
|  | 3 | T'-3 | TB'-3 | P1(A)-3 30 | RP2-1 70 | 12.3 | 6.5 | 13 | 135 | 200 |
|  | 4 | T'-4 | TB'-4 | P1(A)-1 30 | RP2-2 70 | 11.0 | 4.3 | 13 | 130 | 180 |
|  | 5 | T'-5 | TB'-5 | P1(A)-7 | RP2-1 | 12.5 | 7.2 | 17 | 145 | 180 |

|  |  | Blocking resistance | Saturated electrification amount | Rise of electrification | Electrification stability | Mixability Dispersion particle diameter (μm) |
|---|---|---|---|---|---|---|
| Example | 1 | ⊙ | ○ | ○ | ⊙ | 1.6 |
|  | 2 | ⊙ | ⊙ | ⊙ | ⊙ | 0.8 |
|  | 3 | ⊙ | ⊙ | ⊙ | ⊙ | 0.6 |
|  | 4 | ⊙ | ⊙ | ⊙ | ⊙ | 1.0 |
|  | 5 | ⊙ | ⊙ | ⊙ | ⊙ | 0.8 |
|  | 6 | ⊙ | ⊙ | ⊙ | ⊙ | 1.4 |
|  | 7 | ⊙ | ⊙ | ⊙ | ⊙ | 0.8 |
|  | 8 | ○ | ○ | ○ | ⊙ | 0.6 |
|  | 9 | ○ | ⊙ | ⊙ | ⊙ | 1.3 |
|  | 10 | ⊙ | ⊙ | ⊙ | ⊙ | 0.9 |
|  | 11 | ○ | ⊙ | ⊙ | ⊙ | 0.6 |
|  | 12 | ⊙ | ⊙ | ⊙ | ⊙ | 0.7 |
|  | 13 | ⊙ | ⊙ | ⊙ | ⊙ | 0.7 |
|  | 14 | ○ | ⊙ | ⊙ | ⊙ | 1.1 |
|  | 15 | ○ | ○ | ○ | ○ | 1.2 |
|  | 16 | ○ | ○ | ○ | ○ | 1.4 |
| Comparative Example | 1 | X | X | Δ | X | 2.4 |
|  | 2 | X | Δ | Δ | X | 10~ |
|  | 3 | X | X | Δ | X | 10~ |
|  | 4 | ○ | Δ | Δ | Δ | 0.9 |
|  | 5 | X | X | X | X | 10~ |

Evaluation Methods

[1] Minimum Fixing Temperature (MFT)

Using the above-mentioned toners, unfixed images developed using a commercial copier (AR5030: manufactured by Sharp Corp.) were evaluated by using a fixing device of the commercial copier (AR5030: manufactured by Sharp Corp.). The fixing roll temperature at which the residual ratio of the image density measured using a Macbeth reflective concentration meter RD-191 (manufactured by Macbeth) after rubbing a fixed image with a pad was 70% or more was determined as the minimum fixing temperature.

[2] Hot Offset Occurrence Temperature (HOT)

Fixation was evaluated in the same manner as in the MFT described above, and the presence or absence of hot offset on a fixed image was visually evaluated. The fixing roll temperature at which hot offset occurred was determined as the hot offset occurrence temperature.

As to the minimum fixing temperature (MFT) and the hot offset occurrence temperature (HOT), it is important that the fixing temperature range (the difference between HOT and MFT) is wide.

[3] Storage Stability (Blocking Resistance)

Toners were each placed in a polyethylene bottle, held in a constant temperature water bath at 45° C. for 8 hours, then transferred to a 42-mesh sieve, and then vibrated using a powder tester manufactured by Hosokawa Micron Group at a vibration intensity of 5 for 10 seconds. Subsequently, the amount in % by weight of the toner remaining on the sieve was measured and judged according to the criteria given below, and storage stability was evaluated.

Amount of residual toner in % by weight
⊙: less than 15%
○: 15% or more but less than 25%
Δ: 25% or more but less than 30%
x: 30% or more

[4] Mixability Evaluation

Evaluation was carried out by the method described above.

[Saturated Electrification Amount, Rise of Electrification, Electrification Stability]

A 50-ml glass bottle was charged with 0.5 g of a toner binder and 20 g of a ferrite carrier (F-150 produced by Powdertech Co., Ltd.), which were then moisture conditioned at 23° C. and 50% R.H. for 8 hours or more and then frictionally stirred in a Turbula shaker mixer at 50 rpm for 1, 3, 5, 10, 20, and 60 minutes, and the electrification amount was measured at every time. A blow off charge amount measuring device [manufactured by KYOCERA Chemical Corporation] was used for the measurement. The electrification amount achieved at a friction time of 10 minutes was taken as a saturated electrification amount. An (electrification amount at a friction time of 1 minute)/(electrification amount at a friction time of 10 minutes) ratio was calculated and taken as rise of electrification. Moreover, an (electrification amount at a friction time of 60 minutes)/(electrification amount at a friction time of 10 minutes) ratio was calculated and taken as electrification stability.

[5] Criteria for Saturated Electrification Amount Evaluation
⊙: The absolute value of the saturated electrification amount is 25 μC/g or more.
○: The absolute value of the saturated electrification amount is 20 μC/g or more but less than 25 μC/g.
Δ: The absolute value of the saturated electrification amount is 15 μC/g or more but less than 20 μC/g.
x: The absolute value of the saturated electrification amount is less than 15 μC/g.

[6] Criteria for Evaluation of Rise of Electrification
⊙: 0.7 or more
○: 0.6 or more but less than 0.7
Δ: 0.5 or more but less than 0.6
x: less than 0.5

[7] Criteria for Electrification Stability Evaluation
⊙: 0.8 or more
○: 0.7 or more but less than 0.8
Δ: 0.6 or more but less than 0.7
x: less than 0.6

As described above, the toners (Examples 1 to 16) of the present invention using the toner binders of the present invention were remarkably superior especially in electrification characteristics and blocking resistance to the comparative toners (Comparative Examples 1 to 5) using comparative toner binders.

INDUSTRIAL APPLICABILITY

Since the toner of the present invention using the toner binder of the present invention is excellent in fixing temperature range, storage stability, and the like, the toner is useful as a toner to be used for electrophotography, electrostatic recording, electrostatic printing, and the like.

The invention claimed is:

1. A toner binder which contains a polyester resin (P) comprising a polyester resin (P1) and a polyester resin (P2) which is different from the polyester resin (P1), each of the polyester resins (P1) and (P2) being obtained by polycondensation of a carboxylic acid component (x) and an alcohol component (y), wherein
the alcohol component (y) of the polyester resin (P1) contains 30 to 100 molar % of an adduct (y1) of bisphenol A with 2 to 4 ethylene oxide molecules,
the alcohol component (y) of the polyester resin (P2) contains 50 to 95 molar % of an aliphatic diol (y2) having 2 to 4 carbon atoms,
the polyester resin (P) satisfies the following relationships (1) and (2):

$11.5 \leq SP$ value $[(cal/cm^3)^{1/2}]$ of $(P) \leq 13.0$ (1); and $5.2 \leq HLB$ [according to the Oda method] of $(P) \leq 7.1$ (2), and at least one of the polyester resins (P1) and (P2) is a polyester resin in which 5 molar % or more of terminal hydroxyl groups are esterified with a monocarboxylic acid (x1), a polyester resin in which 5 molar % or more of terminal carboxyl groups are esterified with a monool, or a polyester resin in which 5 molar % or more of terminal hydroxyl groups are modified to vinyl groups.

2. The toner binder according to claim 1, wherein the carboxylic acid component (x) of the polyester resin (P1) and/or (P2) includes a monocarboxylic acid (x1) and a polycarboxylic acid (x2), and 80 to 100 molar % of the (x) is an aromatic carboxylic acid.

3. The toner binder according to claim 1, wherein the adduct (y1) of bisphenol A with 2 to 4 ethylene oxide molecules in the alcohol component (y) of the polyester resin (P1) is an 85% or more adduct (y11) of bisphenol A with 2 ethylene oxide molecules.

4. The toner binder according to claim 1, wherein the content of an adduct of bisphenol A with one ethylene oxide molecule in the adduct (y1) of bisphenol A with 2 to 4 ethylene oxide molecules is 1.5% or less.

5. The toner binder according to claim 1, wherein the alcohol component (y2) of the polyester resin (P2) is ethylene glycol.

6. The toner binder according to claim 1, wherein
the polyester resins (P1) and (P2) satisfy the following relationship (3):

$100 \geq (P2)[G''120]/(P1)[G''120] \geq 1$ (3); and the polyester resin (P2) satisfies the following relationship (4):

$(P2)[G'180] \geq 2000$ (4), wherein (P2)[G"120] means a loss elastic modulus (dyn/cm$^2$) of the polyester resin (P2) at 120° C., (P1)[G"120] means a loss elastic modulus (dyn/cm$^2$) of the polyester resin (P1) at 120° C., and (P2)[G'180] means a storage elastic modulus (dyn/cm$^2$) of the polyester resin (P2) at 180° C.

7. The toner binder according to claim 1, wherein the polyester resin (P1) is a linear polyester resin [P1(A)], the polyester resin (P2) is a nonlinear polyester resin [P2(B)], and the weight ratio of the linear polyester resin [P1(A)] to the nonlinear polyester resin [P2(B)], which is [P1(A)]/[P2(B)], is 10/90 to 90/10.

8. A toner comprising: the toner binder according to claim 1, a colorant; and optionally, one or more additives selected from the group consisting of a release agent, a charge controlling agent and a fluidizer.

9. The toner binder according to claim 1, wherein said at least one of the polyester resins (P1) and (P2) is the polyester resin in which 5 molar % or more of terminal hydroxyl groups are modified to vinyl groups.

10. The toner binder according to claim 1, wherein said at least one of the polyester resins (P1) and (P2) is the polyester resin in which 18 molar % or more of terminal hydroxyl groups are esterified with the monocarboxylic acid (x1).

* * * * *